(12) United States Patent
Satoh et al.

(10) Patent No.: US 10,220,454 B2
(45) Date of Patent: Mar. 5, 2019

(54) INSERT ATTACHMENT MECHANISM, ROTARY CUTTING TOOL, TOOL BODY, WEDGE MEMBER AND ADJUSTMENT MEMBER

(71) Applicant: TUNGALOY CORPORATION, Iwaki-shi, Fukushima (JP)

(72) Inventors: Makoto Satoh, Iwaki (JP); Yuji Shinjo, Iwaki (JP)

(73) Assignee: TUNGALOY CORPORATION, Iwaki-shi, Fukushima (JP)

(*) Notice: Subject to any disclaimer, the term of this patent is extended or adjusted under 35 U.S.C. 154(b) by 227 days.

(21) Appl. No.: 15/303,248

(22) PCT Filed: May 14, 2015

(86) PCT No.: PCT/JP2015/063956
§ 371 (c)(1),
(2) Date: Oct. 11, 2016

(87) PCT Pub. No.: WO2015/174506
PCT Pub. Date: Nov. 19, 2015

(65) Prior Publication Data
US 2017/0028485 A1     Feb. 2, 2017

(30) Foreign Application Priority Data
May 15, 2014   (JP) .................. 2014-101720

(51) Int. Cl.
*B23C 5/00*   (2006.01)
*B23C 5/24*   (2006.01)
*B23C 5/08*   (2006.01)

(52) U.S. Cl.
CPC ............. *B23C 5/2472* (2013.01); *B23C 5/08* (2013.01); *B23C 5/2444* (2013.01); *B23C 2210/168* (2013.01)

(58) Field of Classification Search
CPC ....... B23C 5/08; B23C 5/2437; B23C 5/2441; B23C 5/2444; B23C 5/2472; B23C 5/241; B23C 5/2462; B23C 2200/168
See application file for complete search history.

(56) References Cited

U.S. PATENT DOCUMENTS 1,733,657 A * 10/1929 Norman ................ B23C 5/2437
407/45
1,865,617 A *  7/1932 Curtis ................... B23C 5/2437
407/118

(Continued)

FOREIGN PATENT DOCUMENTS

| CN | 101505895 A | 8/2009 |
|---|---|---|
| JP | 2004-261899 A | 9/2004 |
| JP | 2005-103708 A | 4/2005 |

OTHER PUBLICATIONS

International Search Report dated Jul. 21, 2015 issued in counterpart International (PCT) Application (No. PCT/JP2015/063956).

(Continued)

*Primary Examiner* — Will Fridie, Jr.
(74) *Attorney, Agent, or Firm* — Studebaker & Brackett PC

(57) ABSTRACT

An insert attachment mechanism (100) detachably attaches a cutting insert (2) to an insert attachment part (21) of a tool body (3). The insert attachment mechanism includes an adjustment member (30) and a wedge member (10). The adjustment member (30) is arranged on an inner side of the cutting inset so as to act on the cutting insert in the insert attachment part. The adjustment member is advanceable and retractable in a direction of the central axis of a screw member (40) by rotating the screw member. The wedge member and the cutting insert are arranged on the outer side of the adjustment member in the insert attachment part and exert a pressing force against the cutting insert and an inner (Continued)

wall surface of the insert attachment part. The wedge member (10) is configured such that the screw member (40) is accessible from the outer side of the wedge member.

16 Claims, 22 Drawing Sheets

(56) References Cited

U.S. PATENT DOCUMENTS

| | | | | |
|---|---|---|---|---|
| 2,652,749 | A * | 9/1953 | Hagmeister | B23C 5/2437 241/294 |
| 3,079,671 | A * | 3/1963 | Payne | B23C 5/2444 407/41 |
| 3,298,107 | A * | 1/1967 | Bergstrom | B23C 5/2444 33/636 |
| 3,555,644 | A * | 1/1971 | Owen | B23C 5/2441 407/36 |
| 3,894,340 | A * | 7/1975 | Ellis, Jr. | B23C 5/00 33/201 |
| 4,305,440 | A * | 12/1981 | Lacasse | B23C 5/2437 144/230 |
| 4,311,418 | A | 1/1982 | Erkfritz et al. | |
| 4,318,647 | A | 3/1982 | Erkfritz | |
| 4,848,977 | A * | 7/1989 | Kieninger | B23C 5/207 407/39 |
| 5,209,610 | A | 5/1993 | Arai et al. | |
| 7,037,050 | B1 * | 5/2006 | Maier | B23C 5/241 407/35 |
| 7,300,231 | B1 | 11/2007 | Liu et al. | |
| 2005/0260045 | A1 | 11/2005 | Raab | |
| 2007/0256287 | A1 | 11/2007 | Kocherovsky et al. | |
| 2009/0175693 | A1 * | 7/2009 | Jansson | B23B 27/1685 407/37 |
| 2009/0297282 | A1 | 12/2009 | Mizutani | |
| 2018/0111206 | A1 * | 4/2018 | Deguchi | B23C 5/06 |

OTHER PUBLICATIONS

Written Opinion dated Jun. 21, 2015 issued in counterpart International (PCT) Application (No. PCT/JP2015/063956).

* cited by examiner

INSERT ATTACHMENT MECHANISM, ROTARY CUTTING TOOL, TOOL BODY, WEDGE MEMBER AND ADJUSTMENT MEMBER

RELATED APPLICATIONS

This is a 371 US National Phase of International Patent Application No. PCT/JP2015/063956 filed May 14, 2015 and published as WO 2015/174506A1 on Nov. 19, 2015, which claims priority to JP 2014-101720, filed May 15, 2014. The contents of the aforementioned applications are incorporated by reference in their entirety.

TECHNICAL FIELD

The present invention relates to: an insert attachment mechanism for attaching a cutting insert to a tool body; and a cutting tool to which this insert attachment mechanism is applied. In particular, the present invention relates to a rotary cutting tool detachably fitted with a cutting insert and used for cutting metallic materials and the like.

BACKGROUND ART

Patent Document 1 discloses an example of a conventional rotary cutting tool. A rotary cutting tool that is detachably fitted with a cutting insert in Patent Document 1 employs a wedge member in order to attach the cutting insert in an insert attachment groove in a tool body. The cutting insert is arranged on the radially outer side with respect to the axis of rotation of the tool body. The wedge member is located at a front part of the cutting insert in a tool rotating direction. By fastening a right-and-left screw that is screwed into a threaded hole in the wedge member and a threaded hole in a groove bottom of the insert attachment groove, the wedge member presses a surface of the cutting insert which faces forward in the tool rotating direction and a wedge-contacting surface of the insert attachment groove which faces backward in the tool rotating direction. As a result, the cutting insert is attached to the insert attachment groove of the tool body.

The cutting tool in Patent Document 1 further includes a support member for adjusting the position of a cutting edge in the cutting tool when the cutting edge of the cutting insert is subjected to resharpening. The support member is located on the radially inner side of the cutting insert. The cutting insert is attached so as to be in contact with a contacting surface of the support member which faces radially outward. The support member is inserted into a groove of the tool body in the direction of the above-mentioned axis of rotation (i.e., a direction orthogonal to the radial direction) in such a manner that the support member is engaged with an engagement part of the groove. The position to insert the support member into the groove is selected so as to adjust the cutting edge to be located at a desired position and such position can be varied at a constant pitch in the radial direction.

CITATION LIST

Patent Document

Patent Document 1: JP2004-261899 A

SUMMARY

Technical Problem

In the cutting tool disclosed in Patent Document 1, although the radial position of the cutting edge can be adjusted in a constant pitch in the radial direction, the position adjustment of the cutting edge can be carried out only in that pitch. In other words, the position adjustment mechanism for the cutting edge in Patent Document 1 is not capable of carrying out the position adjustment of the cutting edge by an arbitrary adjustment amount.

One known method to enable the position adjustment of the cutting edge by an arbitrary adjustment amount, is a method using a screw member. When a screw member is used to adjust the position of the cutting edge by an arbitrary adjustment amount, a position adjustment of the cutting edge in the direction of the axis of rotation of the screw member can be achieved by a simple structure. However, when the cutting insert is attached using the wedge member as disclosed in Patent Document 1, the cutting insert exists in the adjustment direction of the position of the cutting insert. Accordingly, the cutting insert or both the cutting insert and the wedge member will be an obstacle, causing a problem of inconvenience in which the screw member cannot be rotated by a wrench or the like unless the cutting insert or both the cutting insert and the wedge member are detached.

The present invention has been made in light of such circumstances and an object of the present invention is to enable the position adjustment of a cutting edge of a cutting insert by an arbitrary adjustment amount more easily while using a wedge member for attaching the cutting insert to a tool body.

Solution to Problem

An aspect of the present invention provides an insert attachment mechanism for detachably attaching a cutting insert to an insert attachment part of a tool body, the insert attachment mechanism comprising: an adjustment member arranged on an inner side of the cutting insert in the insert attachment part to act on the cutting insert, in which a screw member is screwed into at least one threaded hole formed in at least one of the adjustment member and the insert attachment part, the adjustment member being advanceable and retractable in a direction of a central axis of the screw member by rotating the screw member; and a wedge member arranged together with the cutting insert on an outer side of the adjustment member in the insert attachment part, the wedge member being attached so as to exert a pressing force against the cutting insert and an inner wall surface of the insert attachment part by a wedge attachment member, wherein the wedge member is configured such that the screw member is accessible from an outer side of the wedge member.

The insert attachment mechanism having the above configuration according to an aspect of the present invention enables the cutting insert to be firmly attached to the insert attachment part by the wedge action of the wedge member and further enables the position of the cutting edge of the cutting insert to be adjusted by an arbitrary adjustment amount by adjusting the position of the adjustment member using the screw member. In addition, since the wedge member is configured such that the screw member is accessible from the outer side of the wedge member, the screw member can be rotated without detaching the cutting insert and the wedge member. Thus, according to an aspect of the present invention, it is possible to carry out fine adjustment of the position of the cutting edge of the cutting insert more easily in a state in which the cutting insert and the wedge member are arranged in the insert attachment part.

The wedge member preferably has a groove or a through hole for allowing access to the screw member.

The screw member preferably includes two screw parts having different winding directions. In this case, one of the two screw parts may be screwed into the threaded hole formed in the adjustment member and the other one of the screw parts may be screwed into the threaded hole formed in the insert attachment part.

The adjustment member preferably has an engagement part that is engageable with an engagement part provided on the insert attachment part so as to guide a movement of the adjustment member in a direction of the central axis of the screw member.

The engagement part of the adjustment member preferably has a serration shape. The serration shape may have a plurality of projections and recesses. Such engagement part may have various types of engaging shapes having at least one projection or recess.

The insert attachment mechanism preferably further comprises a locator to be arranged in the insert attachment part. In this case, the engagement part of the insert attachment part may be formed in the locator.

The insert attachment mechanism preferably further comprises a second adjustment member for moving the cutting insert in a second direction intersecting with (for example, substantially orthogonal to) a moving direction of the adjustment member associated with a rotation of the screw member. In this case, the second adjustment member may comprise a second screw member that is advanceable and retractable in the second direction.

The present invention also resides in a tool body comprising the insert attachment part of the above-mentioned insert attachment mechanism.

The present invention also resides in a wedge member of the above-mentioned insert attachment mechanism.

The present invention also resides in an adjustment member of the above-mentioned insert attachment mechanism.

The present invention also resides in a cutting tool in which a cutting insert is detachably attached to a tool body, to which the above-mentioned insert attachment mechanism is applied. Such cutting tool may be a rotary cutting tool rotated around an axis of rotation. When the insert attachment mechanism comprises the above-mentioned second adjustment member, the second direction of the second screw member may be a direction substantially parallel to the axis of rotation of the rotary cutting tool.

DESCRIPTION OF EMBODIMENTS

A cutting tool 1 according to an embodiment of the present invention will now be described with reference to the attached drawings.

Figure 1:
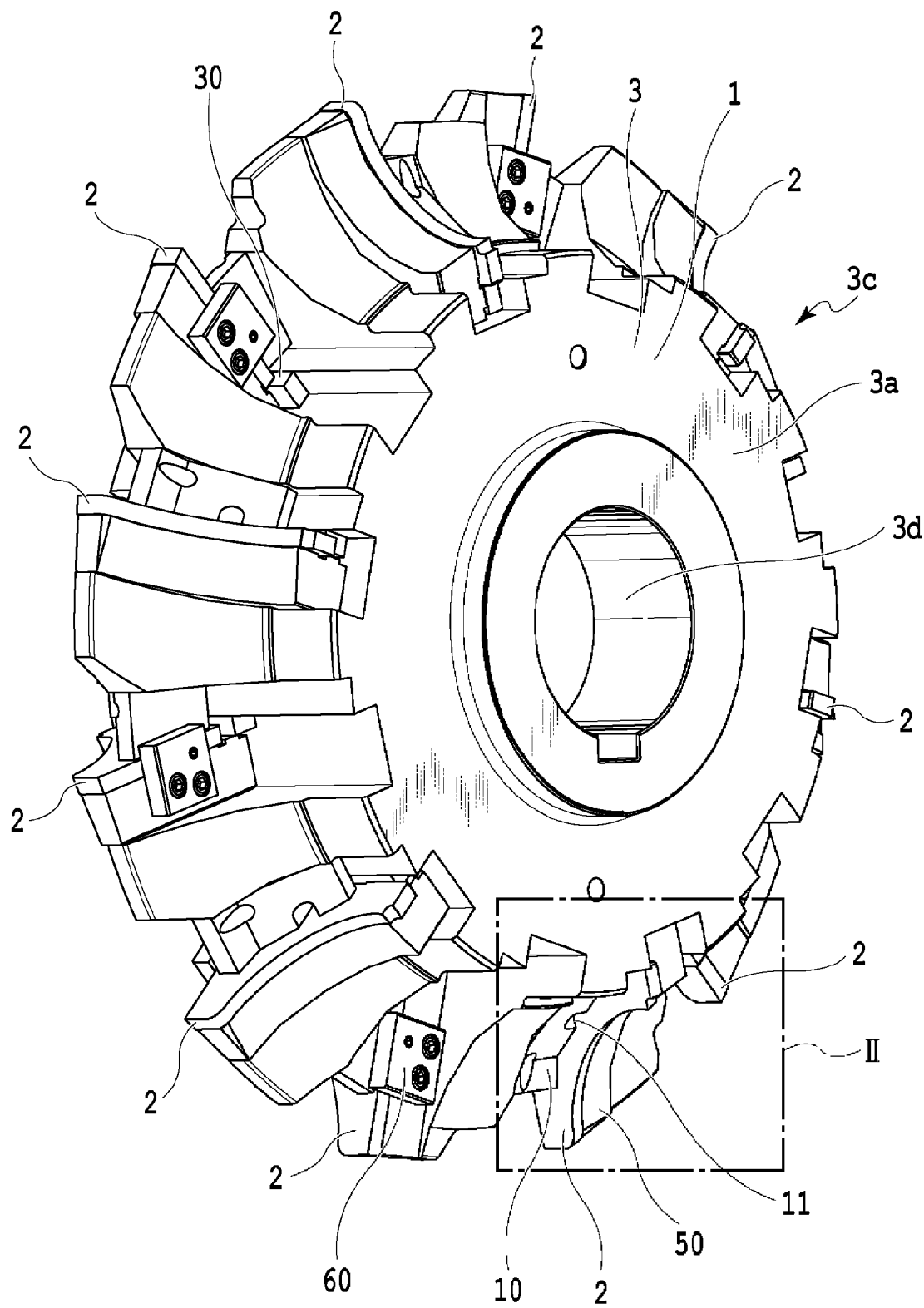
FIG. 1 is a perspective view showing a cutting tool according to an embodiment of the present invention.

As shown in FIG. 1, a rotary cutting tool 1 in this embodiment is a side cutter provided with a substantially discoid tool body 3, more specifically, a gear cutter. The tool body 3 has a substantially discoid shape having two opposing end surfaces 3a, 3b and a peripheral part 3c extending between these two end surfaces. The tool body 3 is provided with a through hole 3d so as to penetrate the two end surfaces 3a, 3b. By fitting a shaft provided in a main shaft or the like of an arbor or a machining tool (not shown) into the through hole 3d, the tool body 3 is attached to the main shaft or the like of the arbor or the machining tool. The rotary cutting tool 1 having the tool body 3 is rotated with the central axis A of the through hole 3d serving as an axis of rotation. The peripheral part 3c is provided with a plurality of insert attachment parts 21. A cutting insert 2 is attached to each insert attachment part 21.

Figure 4:
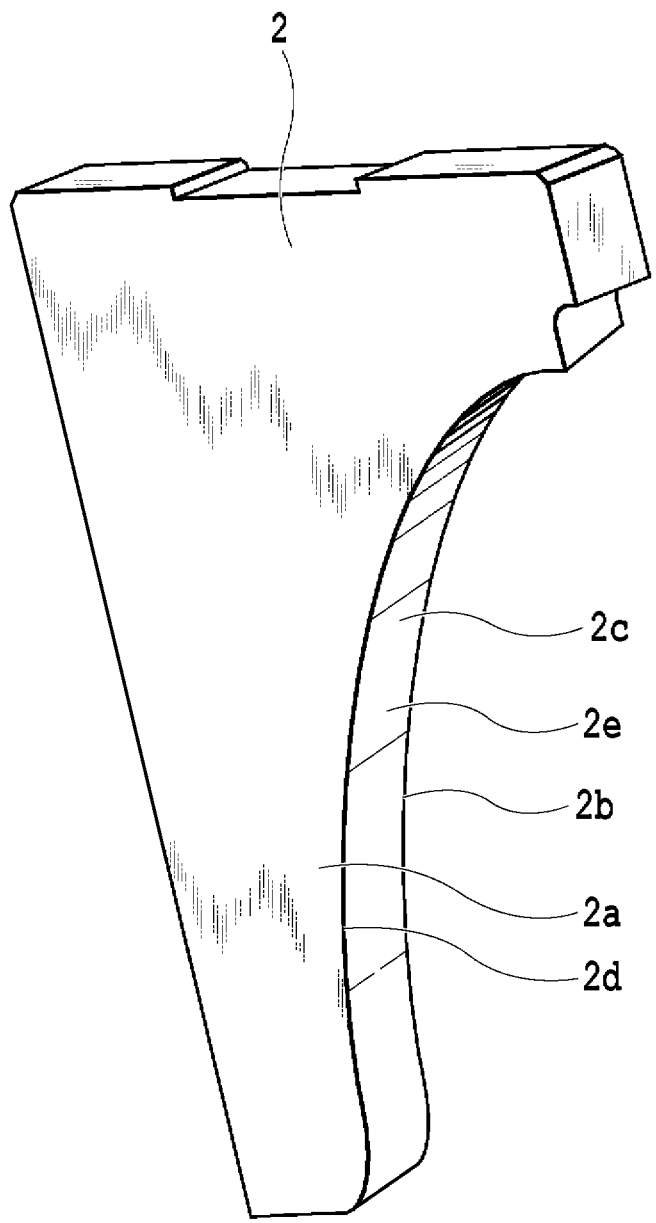
FIG. 4 is a perspective view showing a cutting insert in the cutting tool of FIG. 1.
Figure 5:
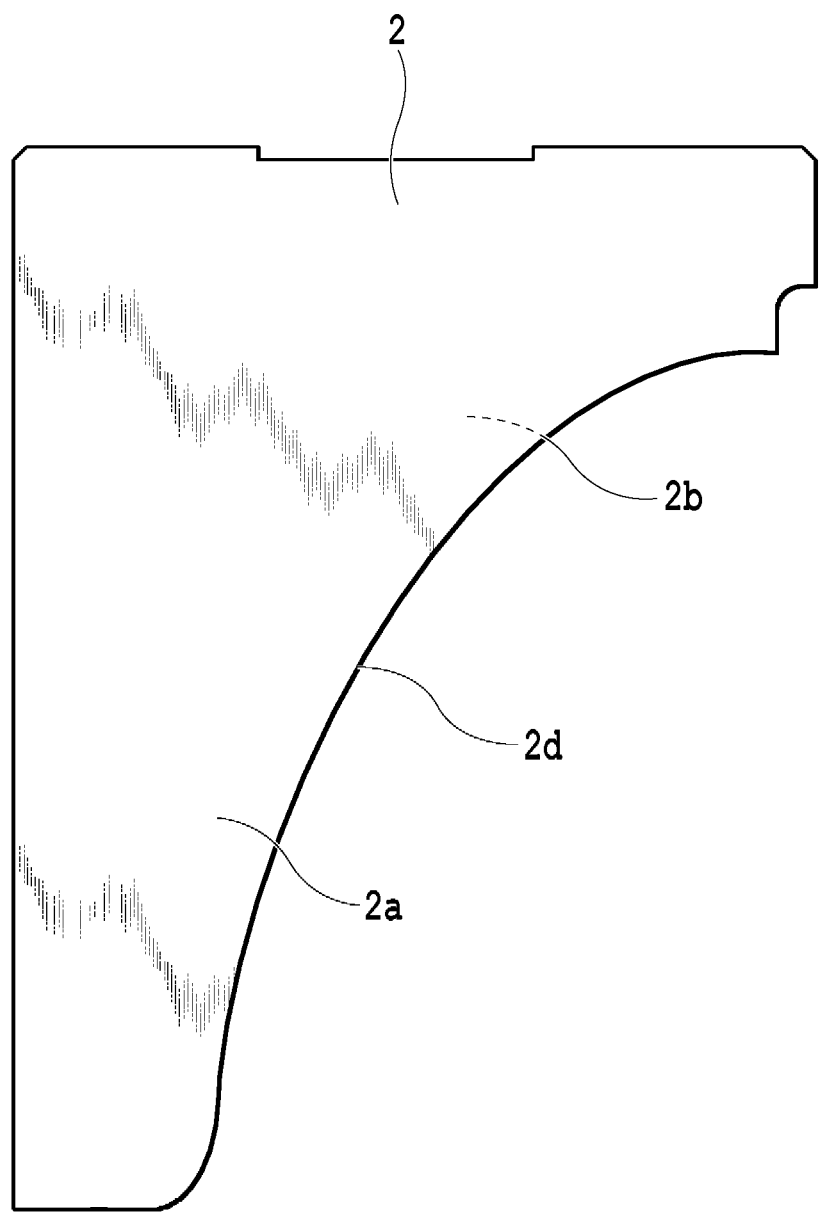
FIG. 5 is a plan view showing the cutting insert of FIG. 4.

The cutting inset 2 has a plate-like shape as shown in FIGS. 4 and 5 and has two opposing end surfaces 2a, 2b and a peripheral side surface 2c extending between the two end surfaces. The cutting insert 2 includes a cutting edge 2d that extends at an intersection between one end surface 2a and the peripheral side surface 2c. The cutting edge 2d is formed so as to be capable of cutting a groove having a curved cross-sectional shape. In particular, since the cutting insert 2 is formed so as to be usable in gear cutting, the cutting edge 2d has a tooth-form curved shape (for example, an involute curved shape). Accordingly, the cutting tool 1 to which the cutting insert 2 has been attached serves as a so-called formed tool, as is obvious from the above description.

The cutting insert 2 includes a right-hand cutting insert 2 and a left-hand cutting insert 2. The right-hand cutting insert 2 and the left-hand cutting insert 2 are arranged alternately on the peripheral part 3c of the tool body 3 so as to form a staggered arrangement. With six cutting inserts 2 being arranged on the end surface 3a of the tool body 3 and six cutting inserts 2 being arranged on the end surface 3b, twelve cutting inserts 2 in total are arranged on the tool body 3. Thus, from among the two end surfaces 3a and 3b, the cutting inserts 2 located on one end surface 3a are right-hand cutting inserts and the cutting inserts located on the other end surface 3b are left-hand cutting inserts 2. The cutting inserts shown in FIGS. 4 and 5 are right-hand cutting inserts 2. Since the left-hand cutting inserts 2 have a shape that is reflection-symmetric to the right-hand cutting inserts 2, the explanation thereof will be omitted.

In the plan view of FIG. 5, the curved edge line formed on the lower right part of the cutting insert 2 is the cutting edge 2d. The end surface 2a having the cutting edge 2d on its edge serves as a cutting face which is referred to herein as an upper surface. A side surface (a curved side surface 2e) in the peripheral side surface 2c having the cutting edge 2d on its edge serves as a flank. However, the cutting edge 2d may extend to a part other than the curved edge line and a portion other than the curved side surface 2e in the peripheral side surface 2c may also serve as the flank. It should be noted that the shape of the cutting edge and the number and arrangement of the cutting inserts 2 to be attached to the tool body are not limited to those indicated in the present embodiment and they may be adjusted as appropriate, depending on the shape of a work piece and the cutting condition.

The cutting tool 1 has an insert attachment mechanism 100 for allowing the cutting insert 2 to be fixed to or attached to (i.e., mounted on) the tool body 3 thereof (i.e., the insert attachment mechanism 100 is applied to the cutting tool 1). The insert attachment mechanism 100 includes a wedge member 10, an adjustment member 30, a locator (position adjustment member) 50 and a second adjustment member 60 and each of these components are detachably attached to an insert attachment part 21.

Figure 17:
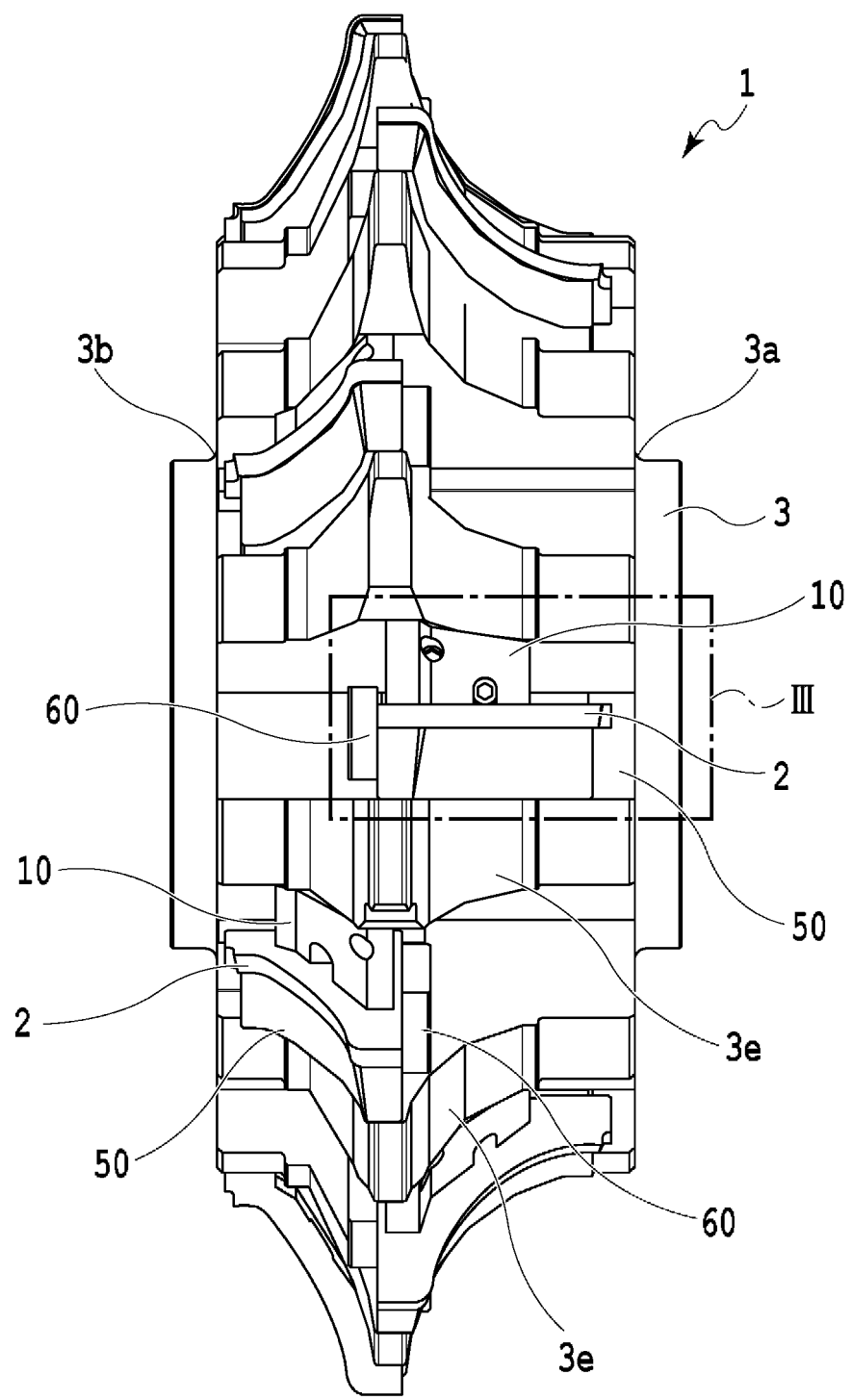
FIG. 17 is a plan view showing the cutting tool of FIG. 1.
Figure 18:
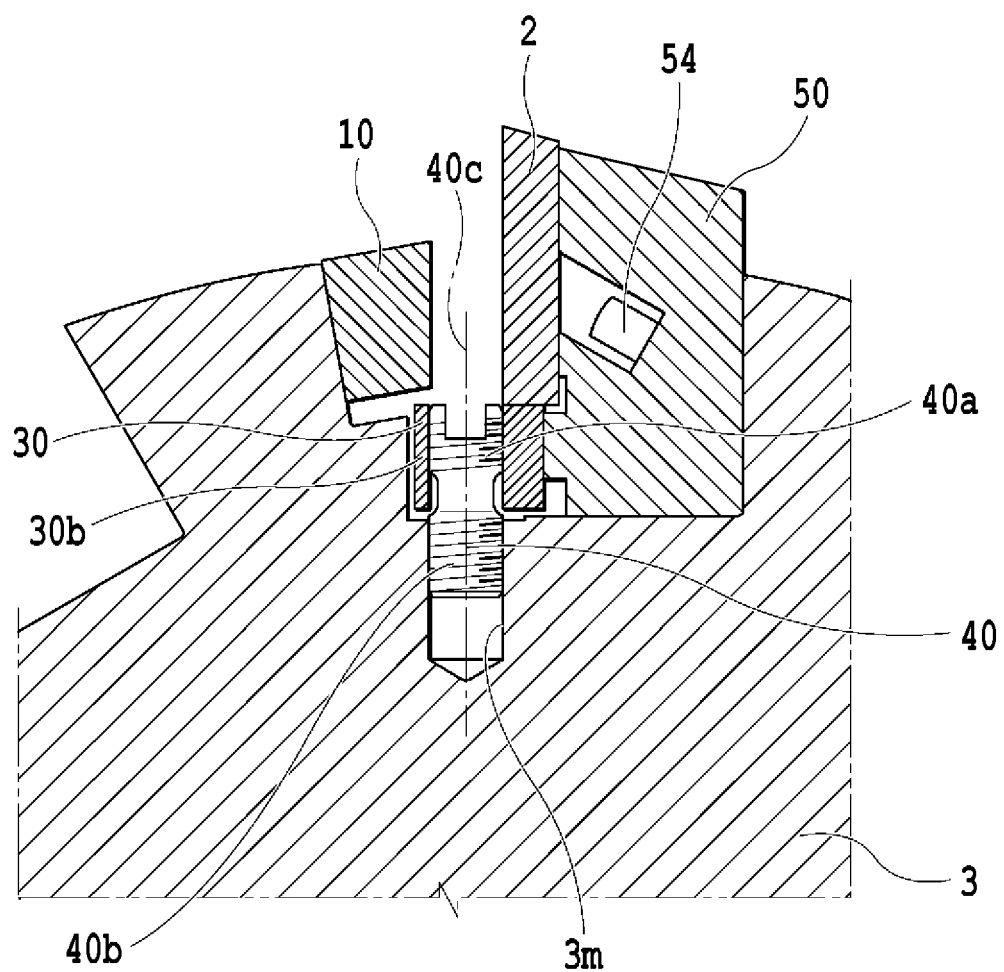
FIG. 18 is a partial cross-sectional view taken along line XVIII-XVIII in FIG. 3 in the cutting tool of FIG. 1.
Figure 19:
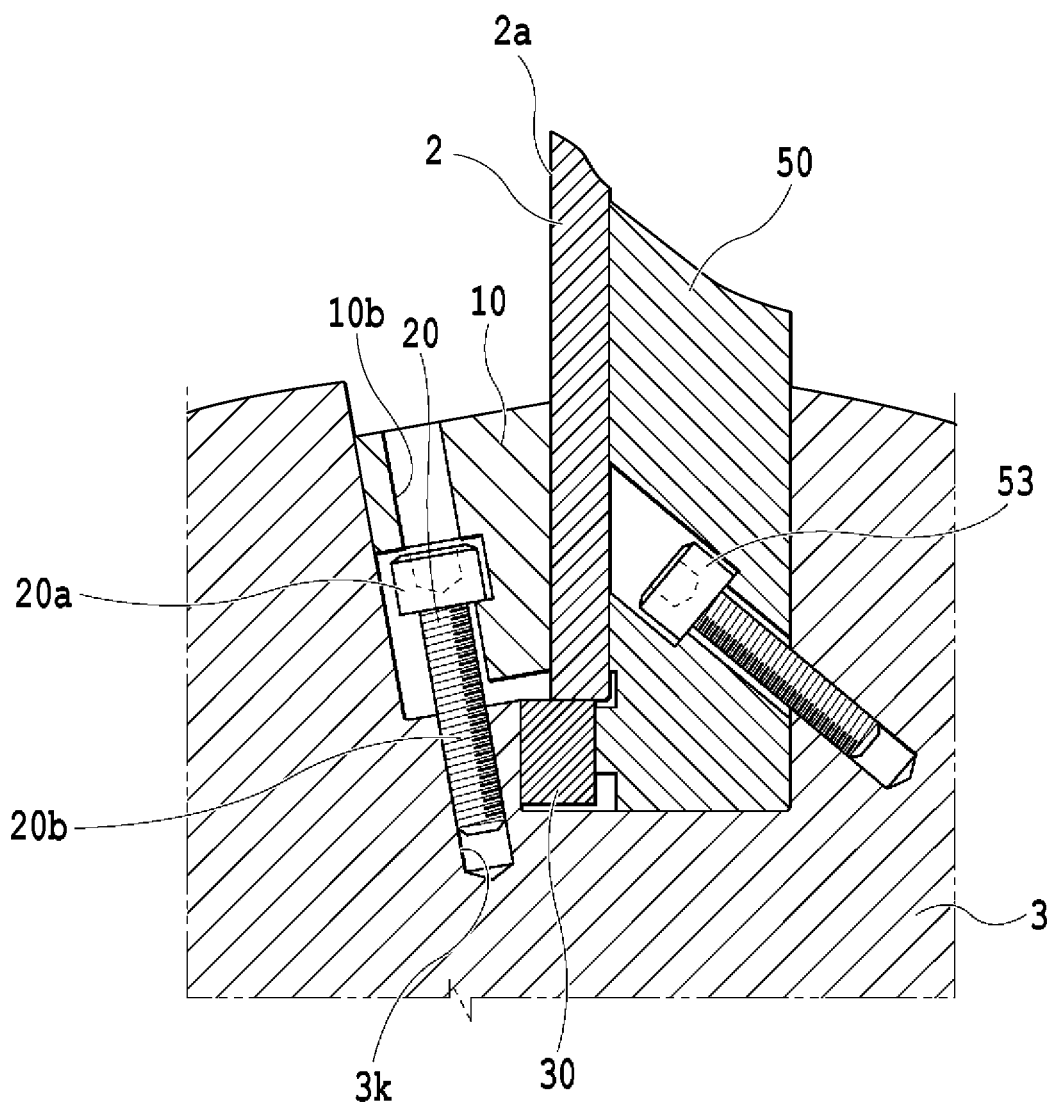
FIG. 19 is a partial cross-sectional view taken along line XIX-XIX in FIG. 3 in the cutting tool of FIG. 1.
Figure 20A:
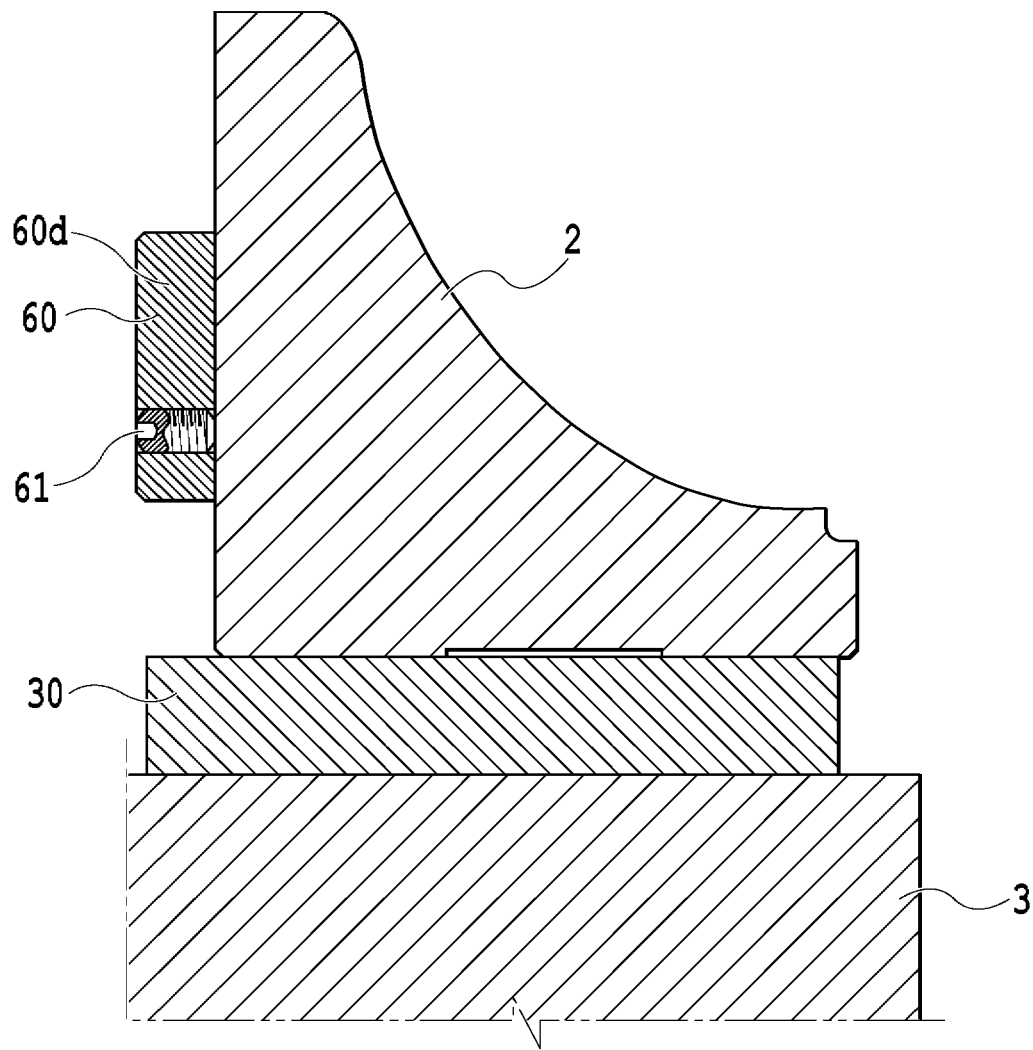
FIG. 20A is a schematic and partial cross-sectional view taken along line XXA-XXA in FIG. 3 in the cutting tool of FIG. 1.
Figure 20B:
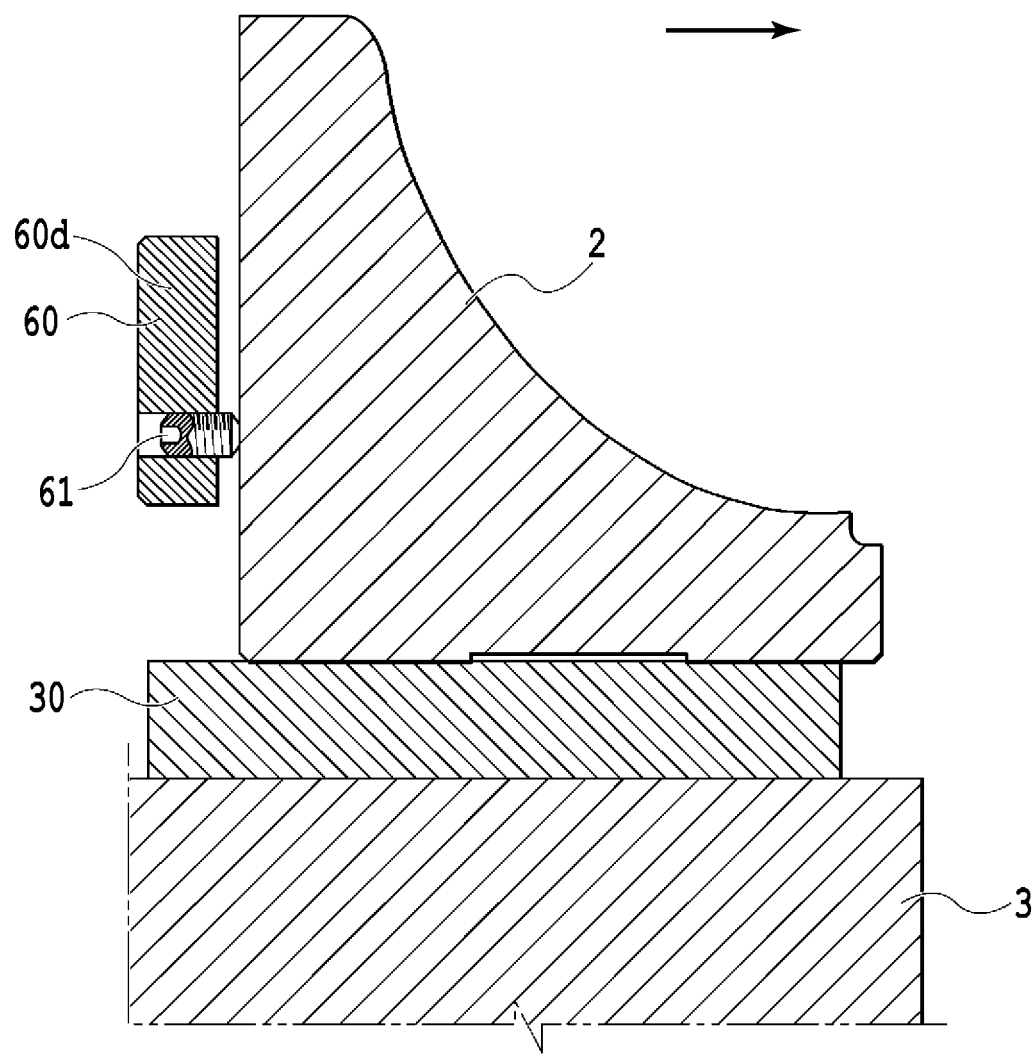
FIG. 20B is a schematic and partial cross-sectional view showing a state in which the position of the cutting insert has been shifted from the state shown in FIG. 20A.

The rotary cutting tool 1 to which the cutting inserts 2 are firmly attached by the insert attachment mechanism 100 is shown in FIGS. 1 and 17. In FIG. 17, the cutting tool 1 is shown such that the central axis A (not shown in FIG. 17) of the through hole 3d which serves as the axis of rotation of the rotary cutting tool 1 is parallel to the plane of the page. Accordingly, the cross-sectional views in FIGS. 18 and 19 are partial cross-sectional views each showing the rotary cutting tool 1 in a plane orthogonal to the central axis A. FIGS. 20A and 20B are partial cross-sectional view each schematically showing the rotary cutting tool 1 in the plane parallel to the central axis A. In the following description, the insert attachment mechanism 100 will be described in detail based on these assembly drawings and cross-sectional views. First, the insert attachment part 21 of the tool body 3, to which the insert attachment mechanism 100 is applied, will be described.

The tool body 3 has a plurality of supporting walls 3e on its peripheral part (or circumferential surface) 3c. Each supporting wall 3e extends so as to be projected generally radially with respect to the central axis A. The supporting walls 3e are arranged at an equal interval in the circumferential direction around the central axis A of the through hole 3d. In the cutting tool 1, the number of supporting walls 3e is the same as the number of cutting inserts 2 to be attached to the tool body 3. Accordingly, the tool body 3 has twelve supporting walls 3e in this embodiment. However, the number of supporting walls 3e may not be the same as the number of the cutting inserts 2 to be attached to the tool body 3.

Figure 21:
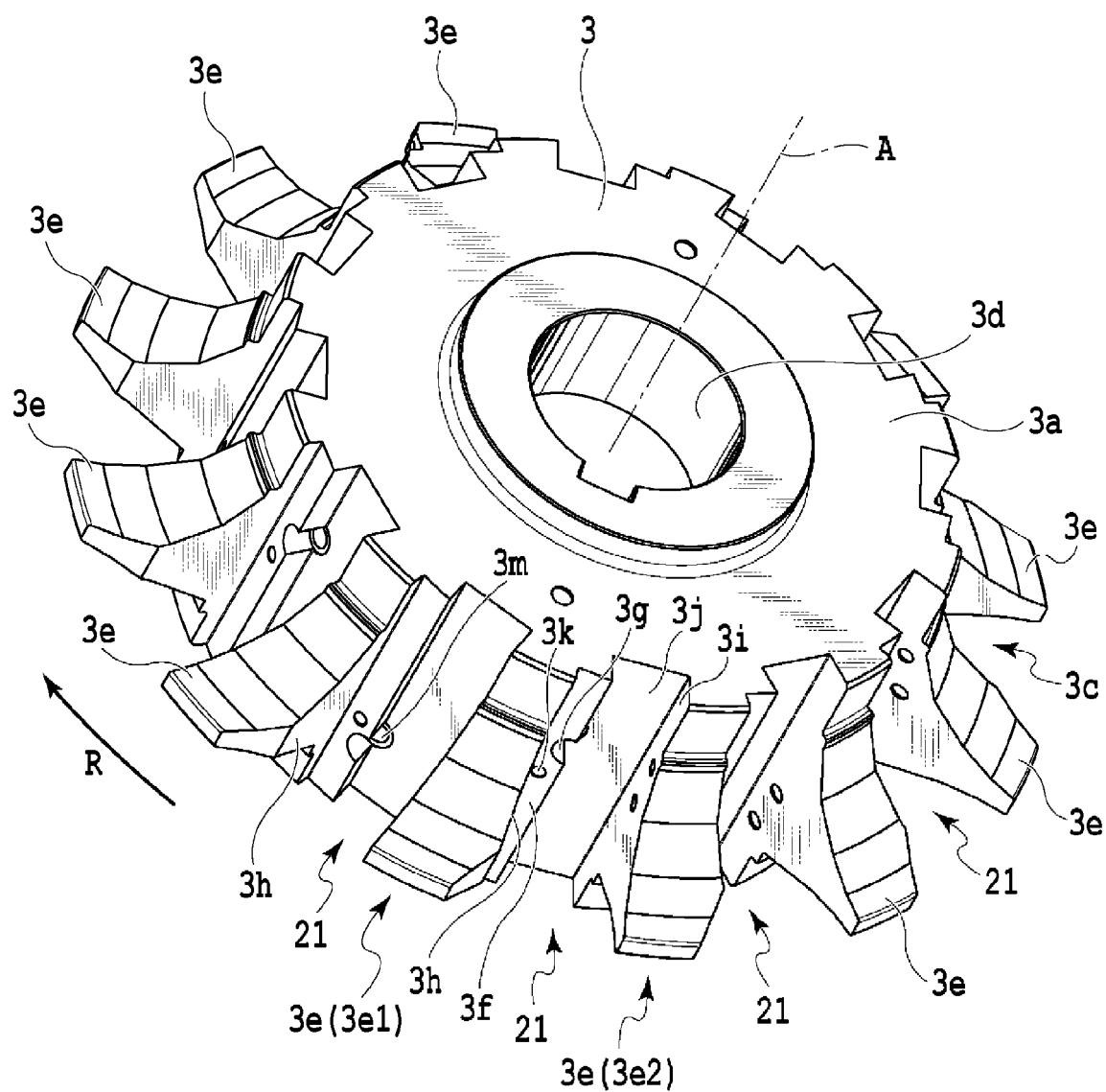
FIG. 21 is a perspective view showing a tool body of the cutting tool in FIG. 1.

Two supporting walls 3e that are adjacent to each other in the circumferential direction define an insert attachment part 21 therebetween. In other words, by focusing on two adjacent supporting walls 30e and terming one of them as a first supporting wall 3e1 and the other one as a second supporting wall 3e2 (see the supporting walls in the lower part of FIG. 21), the insert attachment part 21 is defined generally by: a rear wall surface 3h, which faces backward in a rotating direction R around the central axis A, of the first supporting wall 3e1 located on the front side in the rotating direction R; a front wall surface 3i, which faces forward in the rotating direction R around the central axis A, of the second support wall 3e2 located on the rear side in the rotating direction R; and a bottom wall surface 3j extending between these wall surfaces 3h and 3i. As described above, the insert attachment part 21 having, as its inner wall surfaces, the three wall surfaces 3h, 3i, 3j, has a groove-like or a pocket-like shape and such insert attachment part 21 will therefore be referred to as a pocket in some contexts in the following description. The pocket 21 is formed such that its spatial area is expanded radially outward. This is mainly because the insert attachment mechanism 100 employs the wedge member 10 in order to firmly attach the cutting insert 2. It should be noted that, although each insert attachment part 21 is opened in the direction of the central axis A, the insert attachment part 21 may have one or more walls for supporting the cutting insert 2 in the direction of the central axis A. The pocket 21 to which the right-hand cutting insert 2 is to be attached and the pocket 21 to which the left-hand cutting insert 2 is to be attached have, in general, a bilaterally symmetric relationship (with respect to a virtual plane (not shown) orthogonal to the central axis A of the through hole 3d and passing through the peripheral part 3c).

Each pocket 21 includes: a stepped part 3f based on the positional relationship between the wedge portion 10 and the adjustment member 30 (which will be described in detail later); a recessed part 3g formed in the stepped part 3s so as to be adapted to the shape of the adjustment member 30; and a plurality of threaded holes to be engaged with screw members which will be described later. The stepped part 3f is formed so as to extend in the direction of the central axis A in an intersection space between the rear wall surface 3h and the bottom wall surface 3j. The recessed part 3g is formed by cutting out the stepped part 3f toward the bottom wall surface 3j side. In this way, the stepped part 3f and the recessed part 3g are provided in the rear wall surface 3h of the first supporting wall 3e1, which is located on the front side in the rotating direction R around the central axis A, from among the first and second supporting walls.

Figure 2:
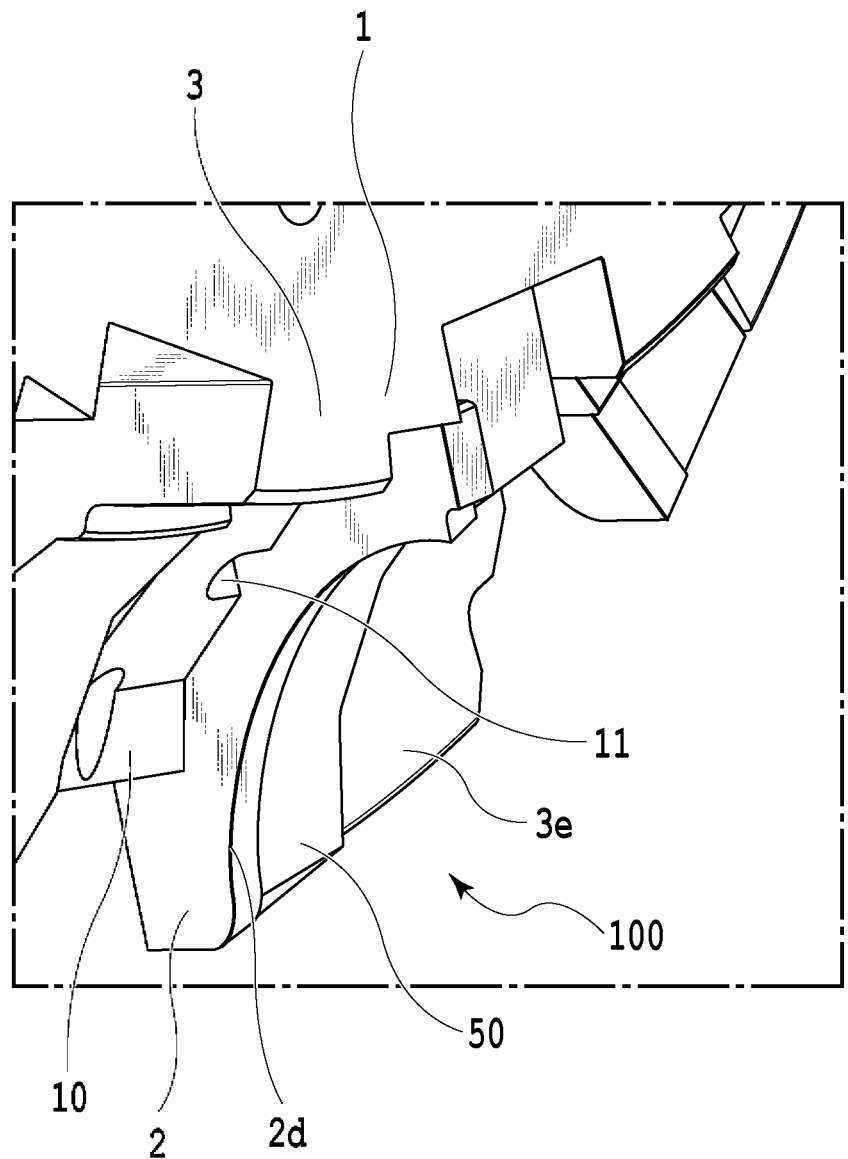
FIG. 2 is an enlarged view showing an area II of FIG. 1 in the cutting tool of FIG. 1.
Figure 3:
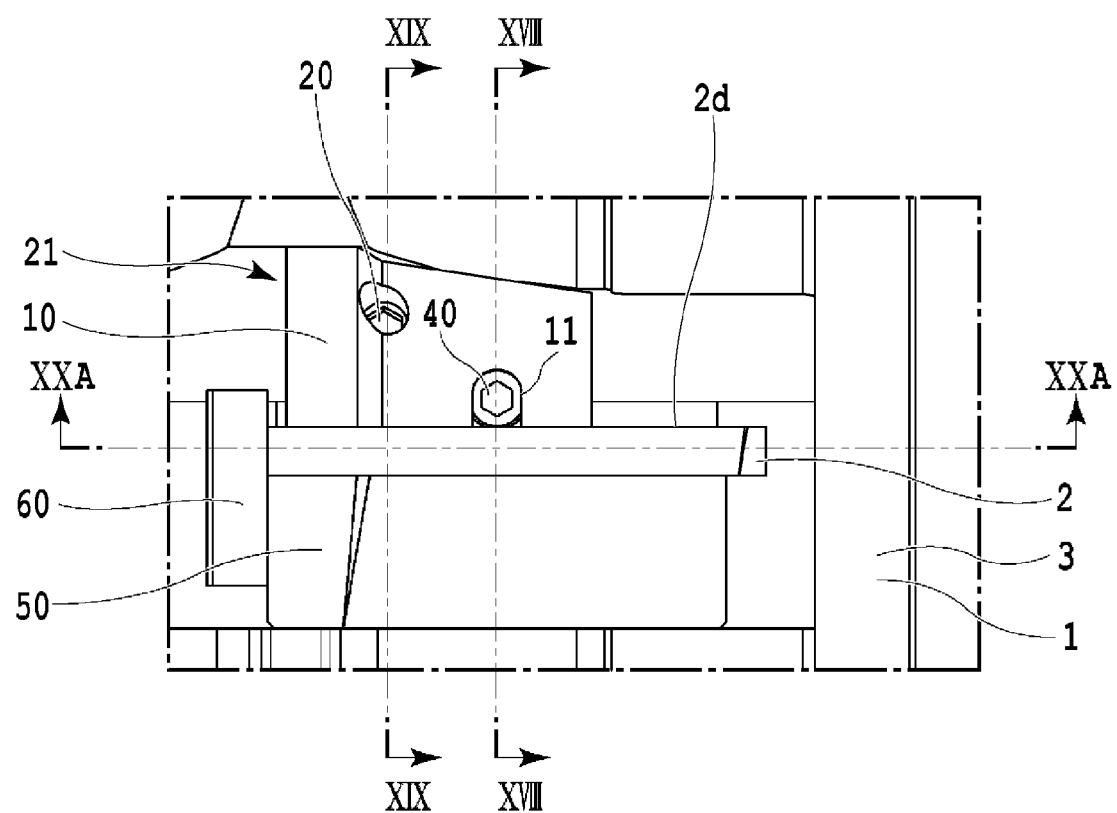
FIG. 3 is an enlarged view showing an area III of FIG. 17 in the cutting tool of FIG. 1.

As can be seen from FIGS. 1-3, the cutting insert 2 of the rotary cutting tool 1 is attached using the wedge member 10. The wedge member 10 is shown in FIGS. 6-12 and is designed to fix the cutting insert 2 in the pocket 21 with its wedge action. As shown in FIG. 3, the wedge member 10 is fixed or attached to the pocket 21 using a wedge attachment member 20. The wedge attachment member 20 is a fastening screw. The wedge member 10 is arranged in the pocket 21. In the rotary cutting tool 1, a threaded hole 3k is provided in the pocket 21. In particular, the threaded hole 3k is provided in the stepped part 3f and extends in a direction intersecting with the bottom wall surface 3j (see FIG. 21). The fastening screw 20 is screwed into the threaded hole 3k and is advanceable and retractable within the pocket 21 in the direction of its central axis in accordance with its rotation around the central axis. By fastening the fastening screw 20 so as to move toward the deepest part of the pocket 21 or to move radially inward, the wedge member 10 is pressed into the deeper side or inner side of the pocket 21. By pressing the wedge member 10 in between the rear wall surface 3h of the pocket 21 and an upper surface 2a of the cutting insert 2 serving as a contact surface facing forward in the rotating direction R of the tool so as to apply a pressing force thereto, the cutting insert 2 is firmly fixed to the tool body 3. When the wedge member 10 is loosened to detach the cutting insert 2, the fastening screw 20 is loosened so as to move radially outward of the pocket 21. The advancing and retracting direction of the wedge member 10 is a direction substantially parallel to the advancing and retracting direction of the fastening screw 20. In this rotary cutting tool 1, as is obvious from FIG. 19, the advancing and retracting direction of the fastening screw 20 is a direction tilted with respect to the upper surface 2a of the cutting insert 2. In particular, the tilt direction of the fastening screw 20 (i.e., the tilt direction of the central axis of the threaded hole 3k) is defined such that the fastening screw 20 is moved further away from the top surface 2a of the cutting insert 2 as it is retracted radially outward and the tilt direction is defined along a virtual plane (FIG. 19) which is orthogonal to the central axis A. In this way, by configuring the advancing and retracting direction of the fastening screw 20 so as to be tilted with respect to the upper surface 2a of the cutting insert 2, the wedge member 10 can be easily released from the cutting insert 2 when the fastening screw 20 is loosened. It should be noted that the shape of the wedge member 10 shown in FIGS. 6-12 will be described later and its explanation is therefore omitted here.

Figure 13:
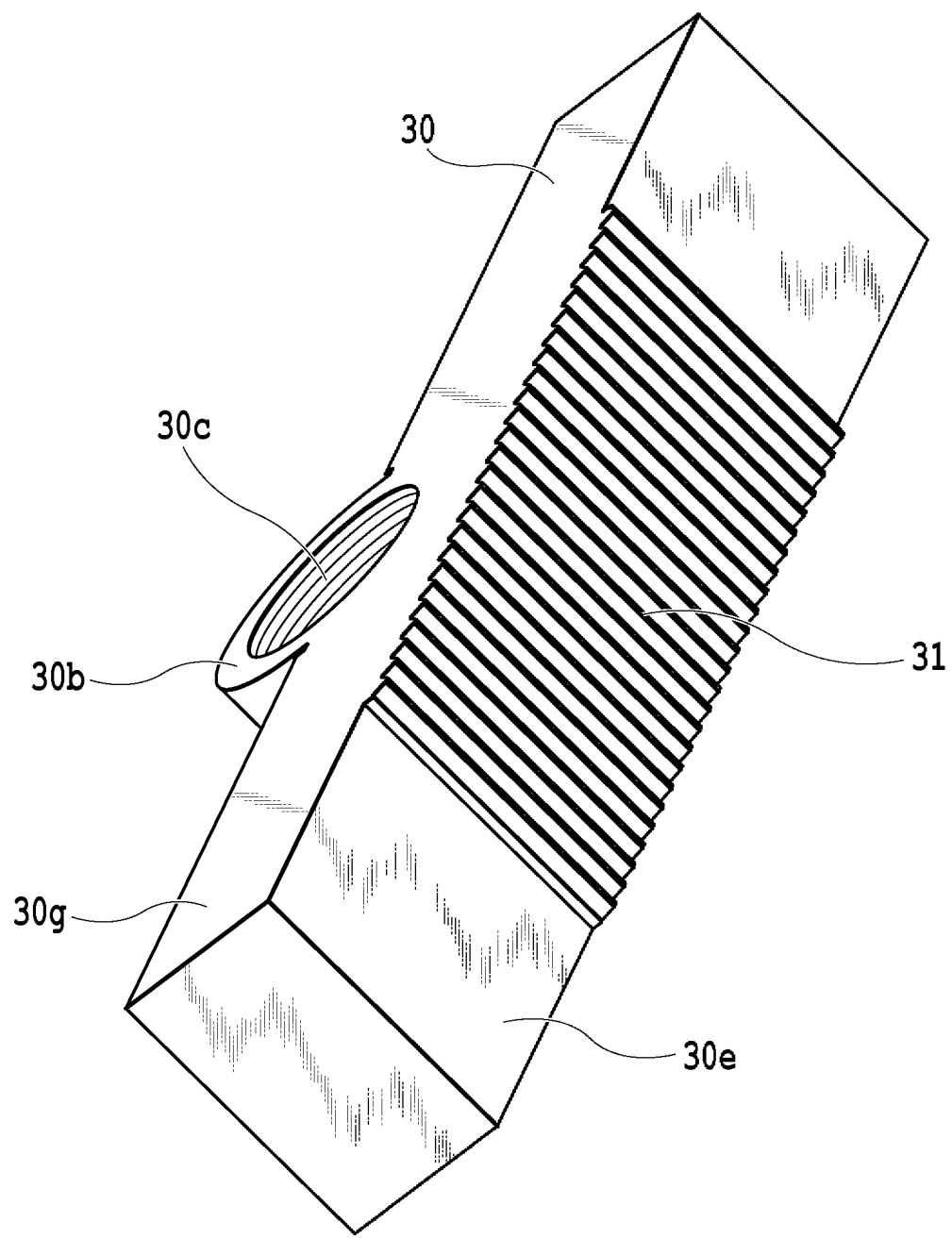
FIG. 13 is a perspective view showing an adjustment member in the cutting tool of FIG. 1.
Figure 14:
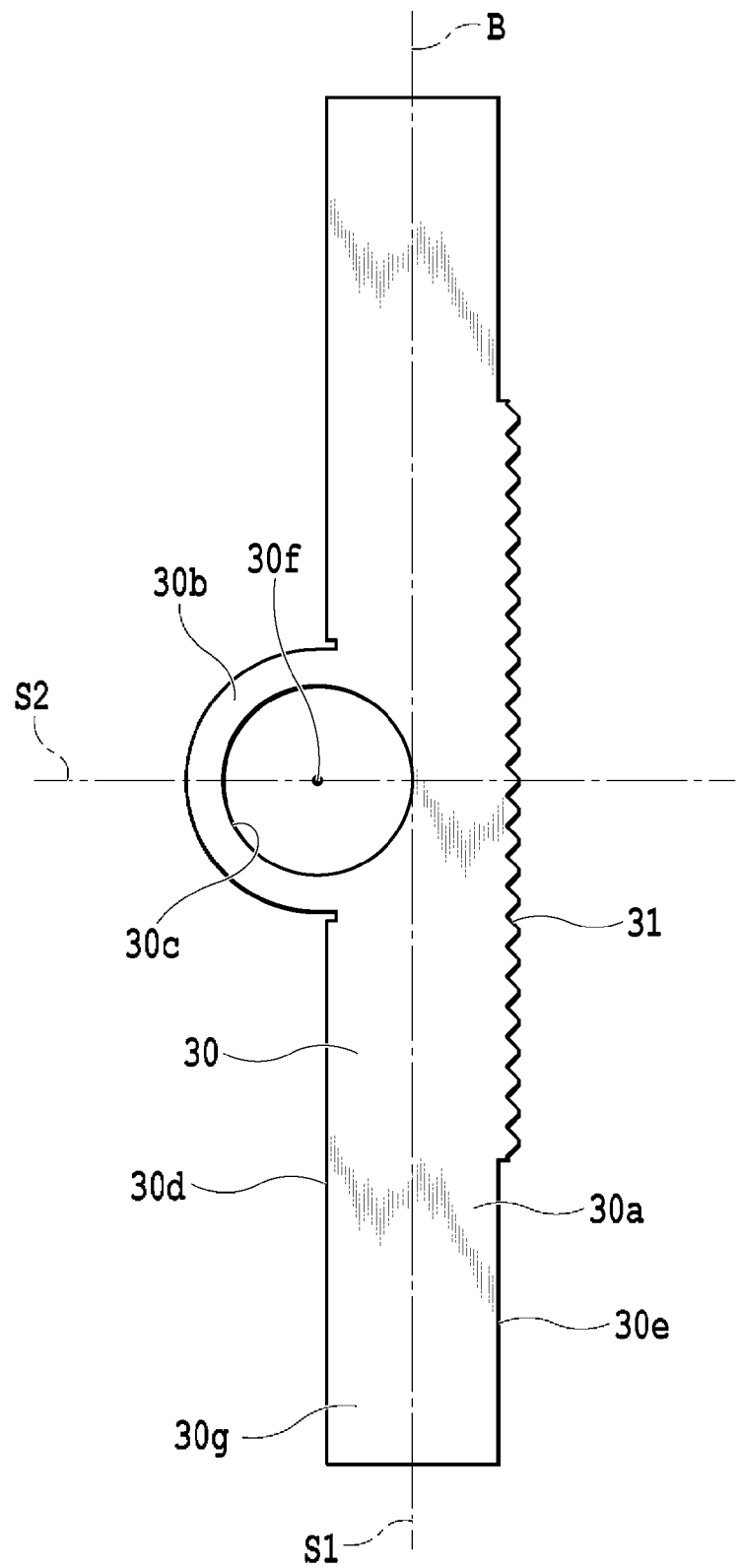
FIG. 14 is a plan view showing the adjustment member of FIG. 13.

FIGS. 13 and 14 show the adjustment member 30. The adjustment member 30 is a member that comes into contact with (acts on) the cutting insert 2 in order to adjust the position of the cutting edge of the cutting insert 2. The adjustment member 30 includes a substantially rectangular parallelepiped body part 30a, a threaded hole part 30b provided substantially at the central position in the longitudinal direction of the body part 30a, and a serration 31 serving as an engagement part having a positional relationship so as to oppose the threaded hole part 30b.

The body part 30a has four surfaces that extend in the longitudinal direction and two relatively small surfaces that extend between these four surfaces. The threaded hole part 30b and the serration 31 are formed in two opposing surfaces from among the four surfaces of the body part 30a which extend in the longitudinal direction. The serration 31 is formed on a surface 30e that opposes a surface 30d in which the threaded hole part 30b is formed so as to be projected. Here, a first virtual plane S1 that extends in the longitudinal direction of the body part 30a and substantially divides the body part 30a into halves is defined as shown in FIG. 14. The first virtual plane S1 extends substantially in parallel to the two surfaces 30d, 30e. The threaded hole part 30b is formed so as to be projected from the body part 30a toward one side (the surface 30d side) of the first virtual plane S1 and located substantially at the opposite side of the serration 31 with respect to the first virtual plane S1. If a second virtual plane S2 were to be defined so as to be orthogonal to the first virtual plane S1 and so as to divide the body part 30a into halves, such second virtual plane S2 would extend so as to contain a central axis 30f of the threaded hole 30c of the threaded hole part 30b. The surfaces other than the two opposing surfaces 30e (on which the serration 31 is formed) and 30d (on which the threaded hole part 30b is formed so as to be projected) are formed as flat surfaces. In particular, a surface 30g that is shown so as to be parallel to the plane of the page showing FIG. 14 and that serves as a contacting surface of the adjustment member 30 to be brought into contact with the cutting insert 2 is shown as a flat surface, but it may not necessarily be flat. It should be noted the shape of the threaded hole part 30b projected from the body part 30a is designed so that the threaded hole part 30b fits into the recessed part 3g of the pocket 21.

The serration 31 has a plurality of projections and recesses and more specifically has a serration shape (serrated shape). Although the serration 31 may only have one projection or one recess, it has a plurality of projections and recesses. The recesses (groves) and projections (ridges) of the serration 31 extend substantially in parallel to the second virtual plane S2 and substantially in parallel to the central axis 30f of the threaded hole 30c. The projections and recesses of the serration 31 define the advancing and retracting direction of the adjustment member 30 within the pocket 21. Accordingly, the serration 31 engages with a serration, serving as an engagement part, of the locator 50, which will be described later, and functions as a guide for the adjustment member 30. The serration 31 may have any shape as long as it can prevent the adjustment member 30 from being tilted in the pocket 21 (i.e., any shape capable of firmly guiding the adjustment member 30 may be employed).

A screw member 40 is screwed into the threaded hole 30c of the adjustment member 30. The threaded hole 30c has a screw thread in its inner surface. The screw member 40 is also brought into contact with the pocket 21. Specifically, the screw member 40 is formed so as to also be screwed into the threaded hole 3m formed in the pocket 21. The threaded hole 3m is located in the recessed part 3g and extends so as to be crossed with, in particular, so as to form a right angle with respect to, the bottom wall surface 3j. The adjustment member 30 is configured to be advanceable and retractable with respect to the pocket 21 in the central axis direction of the screw member 40 (i.e., the central axis direction of the threaded hole 3m). The screw member 40 of the rotary cutting tool 1 is configured as a so-called right-and-left screw that includes two screw parts 40a and 40b having different winding directions. As is obvious from FIG. 18, the two screw parts of the screw member 40 are arranged in line in the direction of an axis 40c of the screw member 40 with one (40a) of the two screw parts being screwed into the threaded hole 30c of the adjustment member 30 and the other one (40b) of the screw parts being screwed into the threaded hole 3m of the pocket 21. Since the winding directions of the two screw parts of the screw member 40 are different from each other, by rotating the screw member 40 around its central axis 40c thereof in a state in which it is being engaged with the adjustment member 30 and the pocket 21, the adjustment member 30 becomes advanceable and retractable in the direction of the central axis 40c of the screw member 40 in the pocket 21. Since the central axis 40c of the screw member 40 (i.e., the central axis of the threaded hole 3m) is parallel to the plane of the page showing FIG. 18, the advancement and retraction of the screw member 40 due to the engagement with the screw hole 3m is generated along a virtual plane orthogonal to the central axis A of the through hole 3d. The distance of advancement and retraction of the screw member 40 can be freely set with respect to the rotational angle of the screw around the central axis 40c and can be set, for example, to be relatively large. Thus, even in a situation in which a space for rotating a wrench engaging the engaging part on one end (an end on the screw part 40a side in the direction of the central axis 40c) of the screw member 40 is small, the positional adjustment of the adjustment member 30 can still be performed easily. The total length of the adjustment member 30 (the length along the first virtual plane) of such rotary cutting tool 1 is about 70 mm. The thickness of the adjustment member 30 (the maximum length in the threaded hole part 30 along the second virtual plane) is about 15 mm. However, the size of the adjustment member 30 is not limited to such length and thickness.

As can be seen in FIGS. 6-12, the wedge member 10 has a wedge shape as a whole and has an outer contour of a substantially hexahedron shape. The wedge member 10 further includes: a screw engagement part 10*a* for attaching the wedge member 10; and a groove 11. The wedge member 10 includes: a front contact surface 10*c* that can be brought into contact with the rear wall surface 3*h* of the supporting walls 3*e* defining the pocket 21; and a rear contact surface 10*d* that generally opposes the front contact surface 10*c* and that can be brought into contact with the upper surface 2*a* of the cutting insert 2. The groove 11 is provided in the rear contact surface 10*c*. The screw engagement part 10*a* is located closer to the front contact surface 10*c* with respect to the groove 11 and is formed so as to open to the front contact surface 10*c*.

The front contact surface 10*c* and the rear contact surface 10*d* of the wedge member 10 are formed in a wedge shape in order to firmly fix the cutting insert in the tool rotating direction R within the pocket 21 and are formed so as not to be parallel to each other. In addition, as shown in FIG. 3, the front contact surface 10*c* and the rear contact surface 10*d* of the wedge member 10 are tilted with respect to each other so as to be tapered toward the cutting edge 2*d* in the direction of the central axis A, when arranged in the pocket 21. Accordingly, the wedge member 10 is prevented from being shifted toward the cutting edge 2*d* within the pocket 21.

Figure 6:
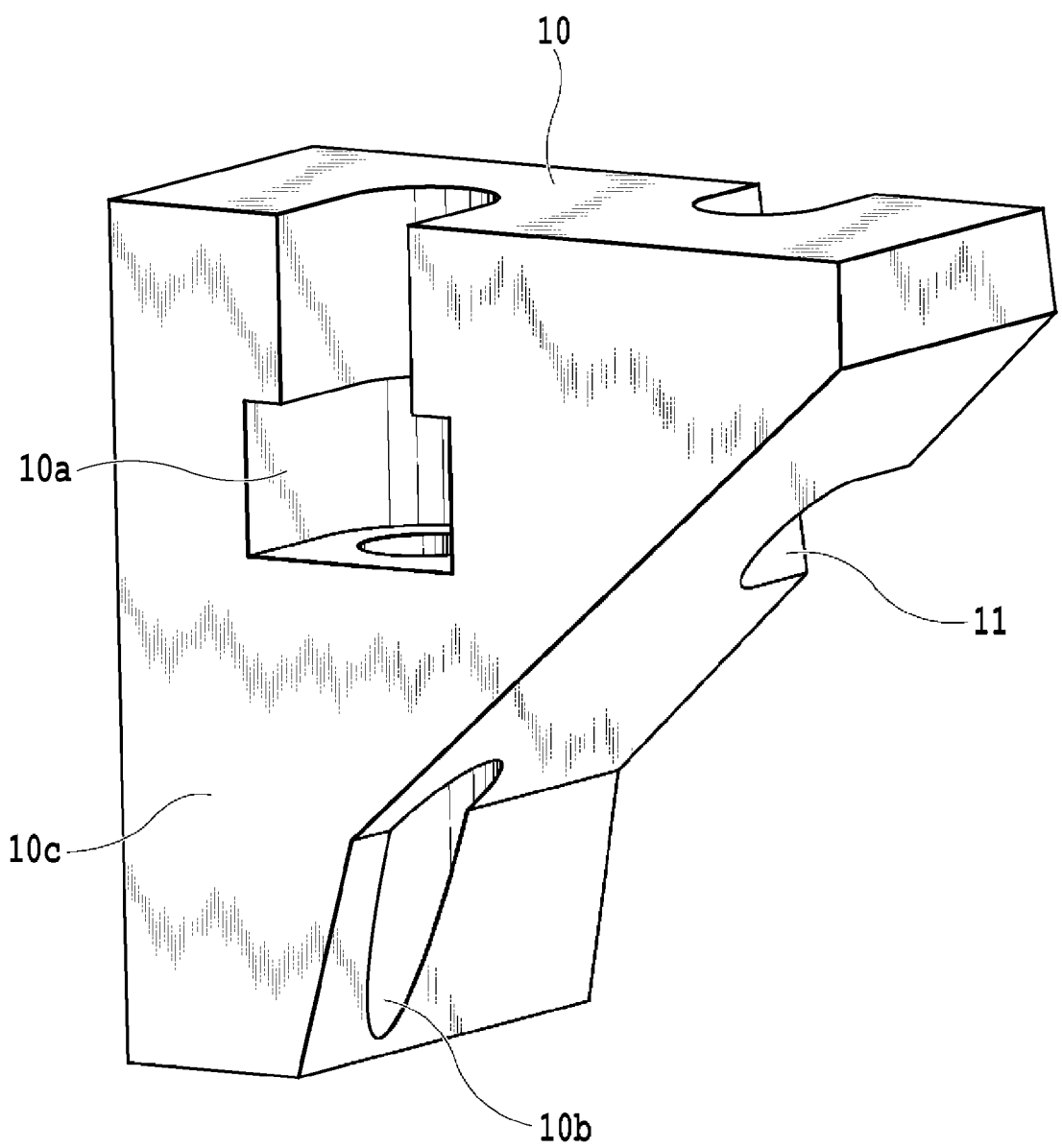
FIG. 6 is a perspective view showing a wedge member in the cutting tool of FIG. 1.
Figure 7:
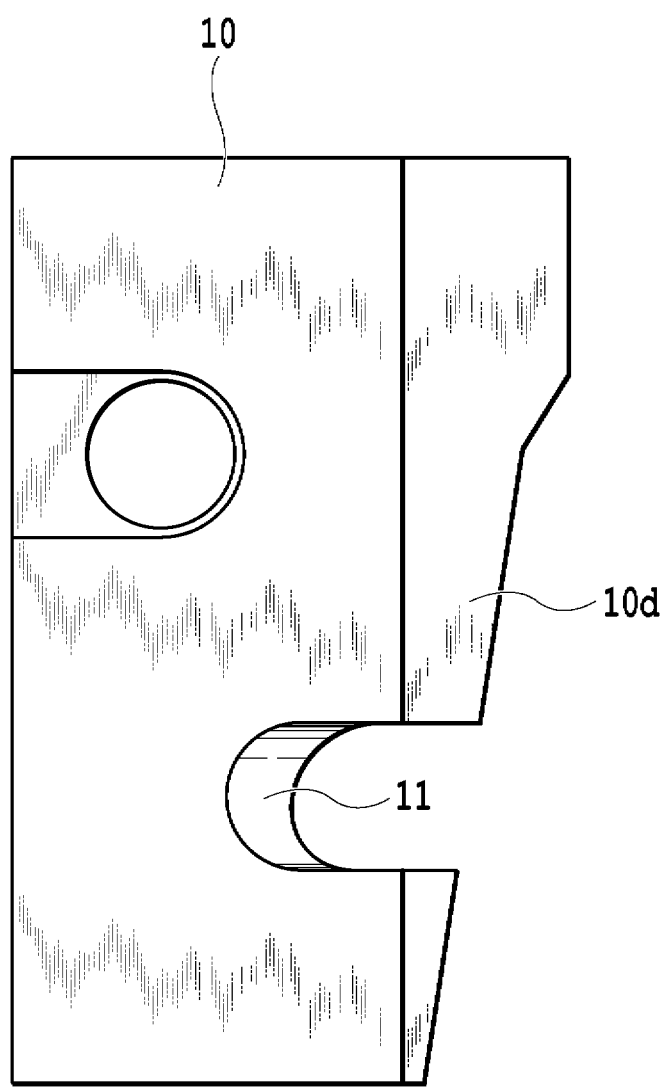
FIG. 7 is a plan view showing the wedge member of FIG. 6.
Figure 8:
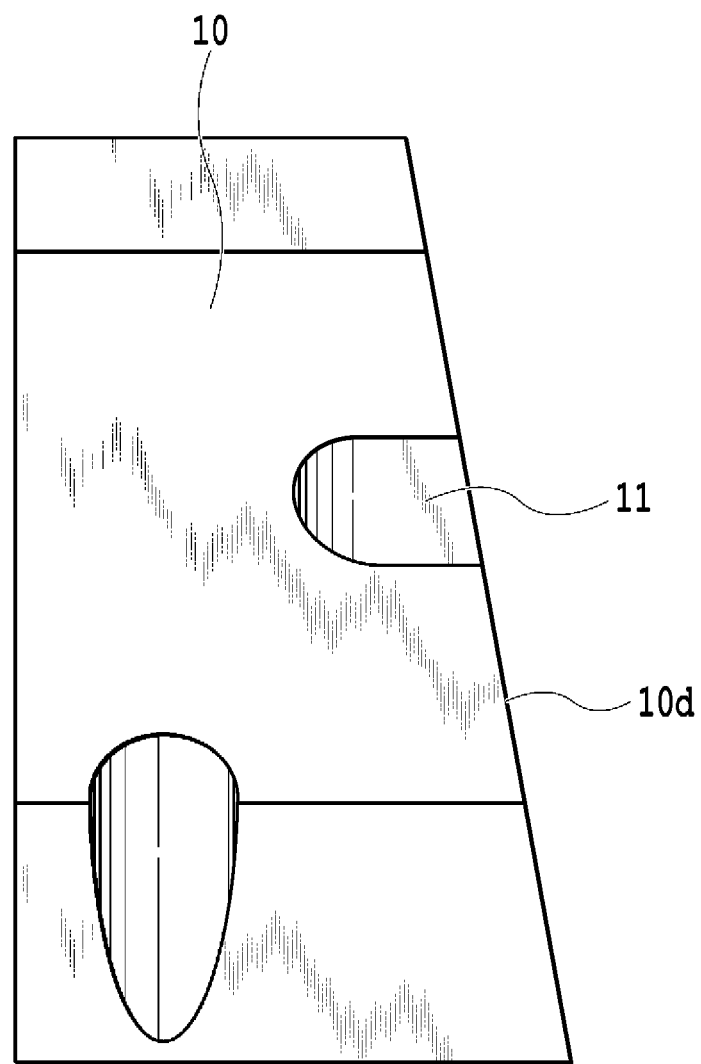
FIG. 8 is a front view showing the wedge member of FIG. 6.
Figure 9:
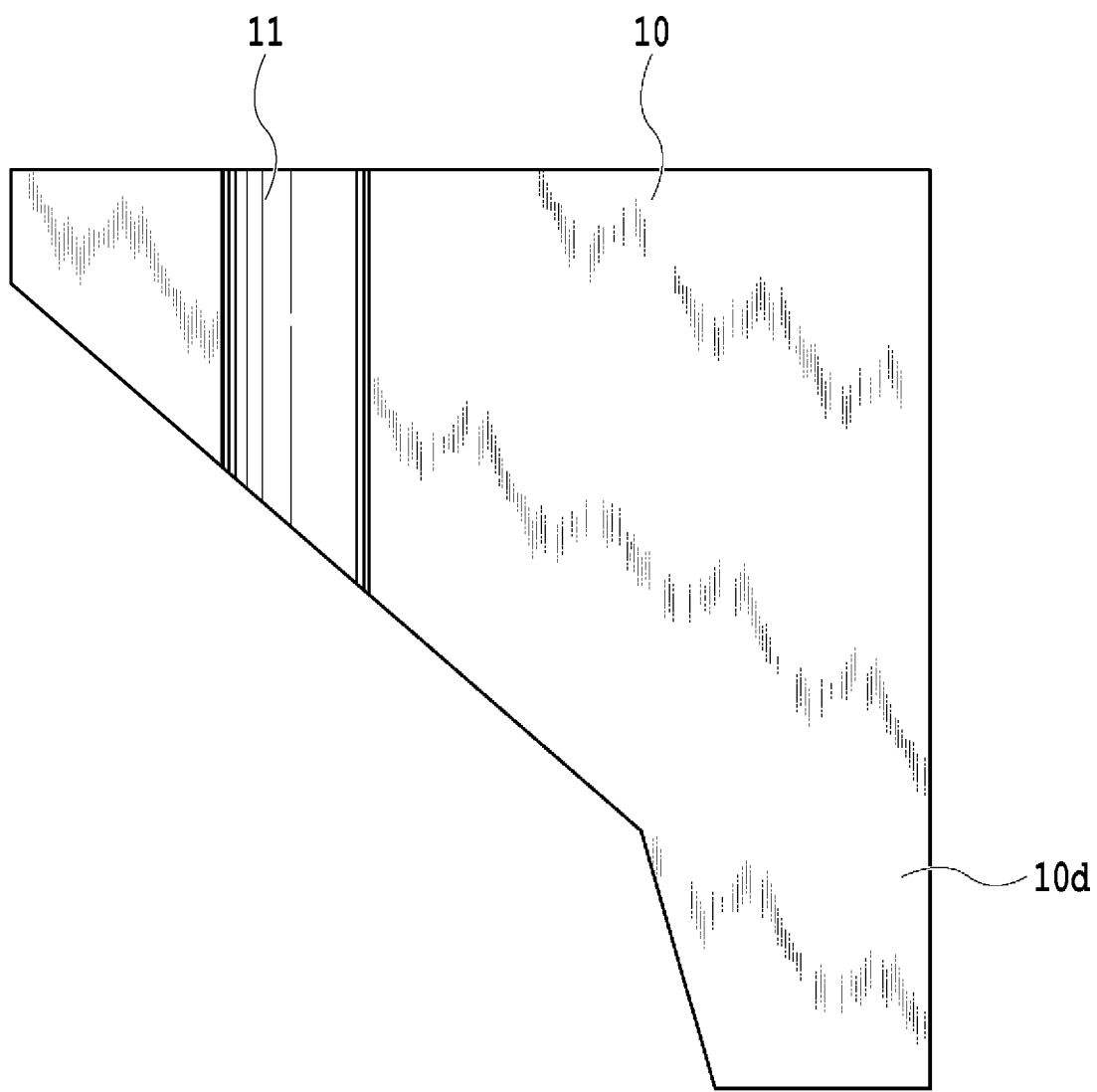
FIG. 9 is a right side view showing the wedge member of FIG. 6.
Figure 10:
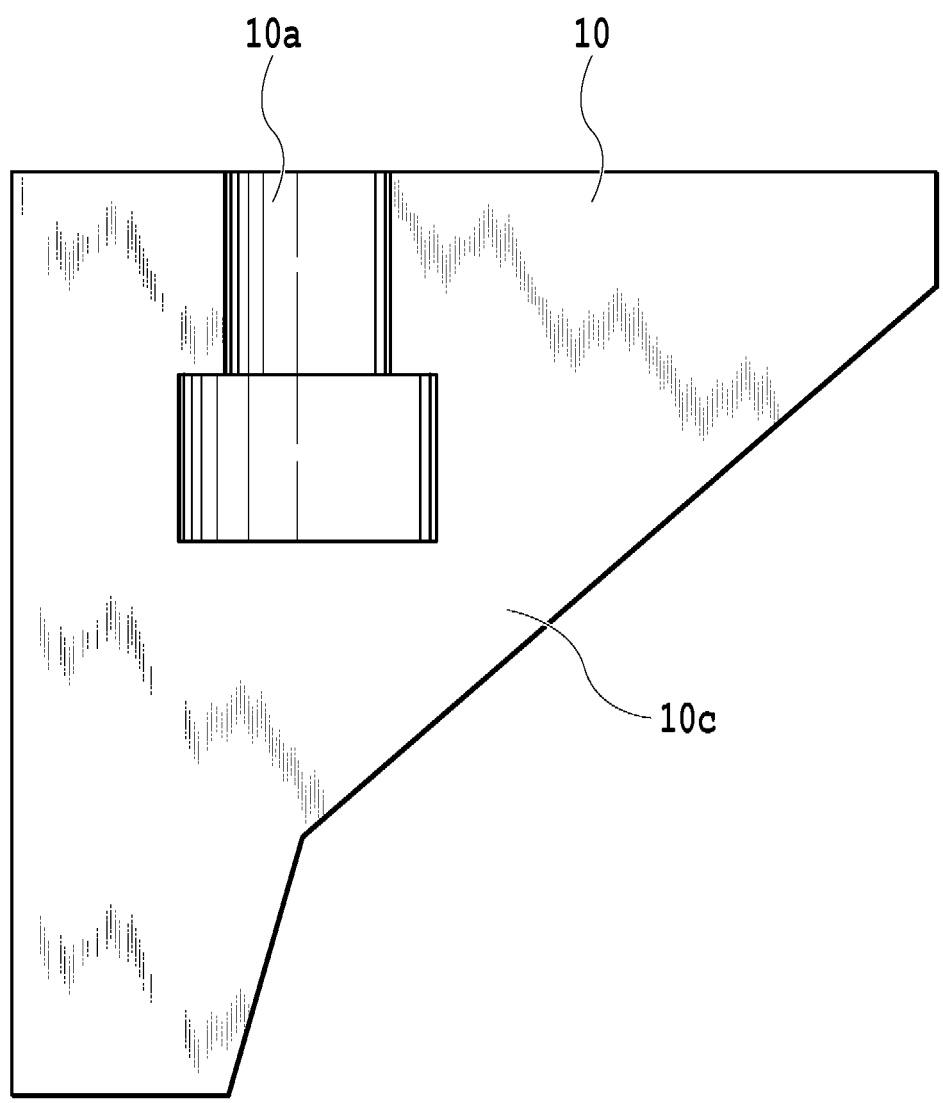
FIG. 10 is a left side view showing the wedge member of FIG. 6.
Figure 11:
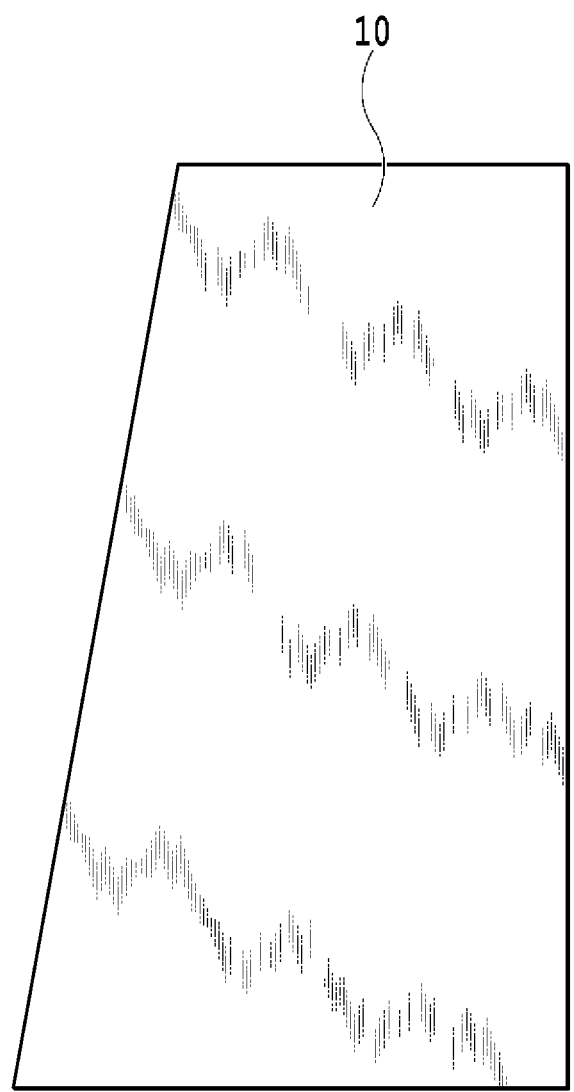
FIG. 11 is a rear view showing the wedge member of FIG. 6.
Figure 12:
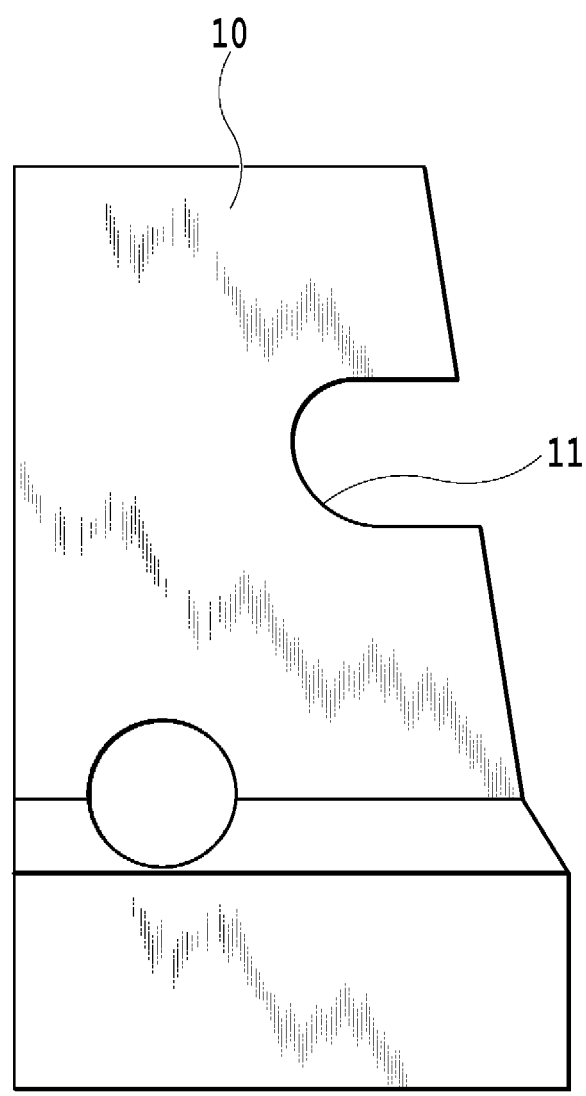
FIG. 12 is a bottom view showing the wedge member of FIG. 6.

As shown in FIG. 6, the screw engagement part 10*a* is configured such that a head part 20*a* of the fastening screw 20, being the wedge attachment member, is accommodated therein and engaged therewith and the screw part 20*b* of the fastening screw 20 is projected toward the outer side of the wedge member 10. The fastening screw 20 is screwed into the threaded hole 3*k* of the pocket 21 (see FIG. 19). The fastening screw 20 in the screw engagement part 10*a* is accessed by inserting a wrench or a screwdriver into an access hole 10*b* formed in the wedge member 10. The wrench or screwdriver is engaged with an engagement recess in the head part 20*a* of the fastening screw 20. It should be noted that the access hole 10*b* has a size that does not allow the head part 20*a* of the fastening screw 20 to pass therethrough.

The groove 11 in the wedge member 10 is a groove for allowing the wrench or screwdriver for rotating the screw member 40 for the adjustment member 30 to pass therethrough. Thus, as will be described later, when the adjustment member 30 is arranged on a radially inner side (or the deeper side) of the pocket 21 and the wedge member 10 is arranged on the radially outer side thereof, the groove 11 extends on an extension of the axis of rotation (the central axis 40*c*) of the screw member 40, thereby providing a workspace. The groove 11 is formed in a size that allows the wrench or screwdriver to move in and out and has, for example, a cross-sectional area larger than that of the shaft of such wrench or screwdriver.

The groove 11 may be a through hole. The wedge member 10 may be divided into a plurality of members. If the wedge member 10 is constituted by a plurality of members, a workspace for the screw member 40 may be secured by arranging those members constituting the wedge member 10 so as not to cover or block the extension of the axis of rotation of the screw member 40. When the wedge member 10 is constituted by the plurality of members, it is preferable for the wedge attachment member 20 to also be constituted by a plurality of members, although the configuration is not limited thereto. If the plurality of members of the wedge member 10 can be attached in an integrated manner, the wedge attachment member 20 may be a single member. In other words, the wedge attachment member 20 may be constituted by a smaller number of members than the number of components of the wedge member 10. The width of the groove 11 of the rotary cutting tool 1 is about 8 mm. However, the width of the groove 11 is not limited thereto. The wedge member 10 may have any shape or may be divided in any way, as long as the wedge member 10 can exert its wedge action and the wedge member 10 can allow the wrench or screwdriver for rotating the screw member 40 to pass therethrough so as to be workable.

Figure 15:
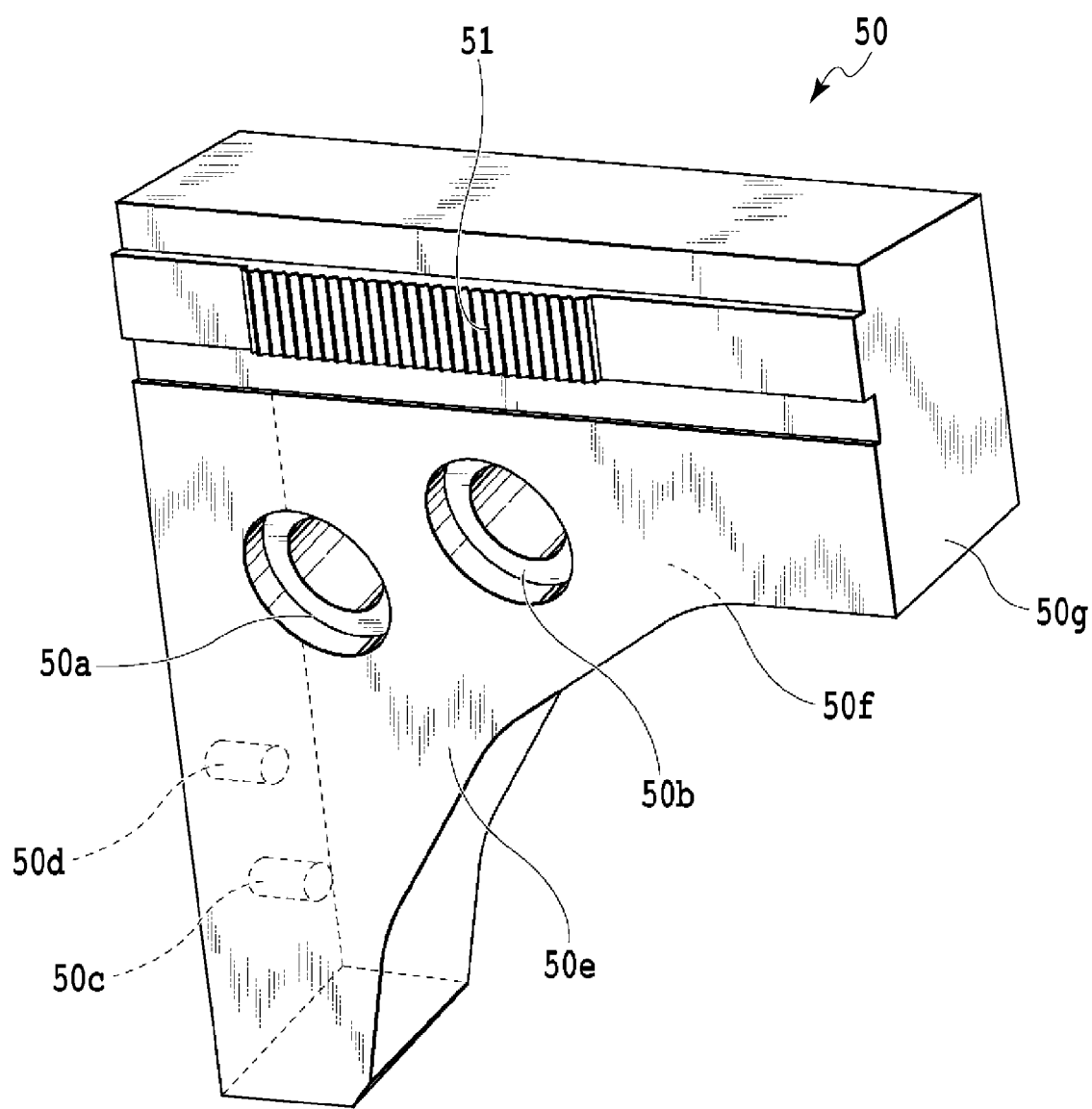
FIG. 15 is a perspective view showing a locator in the cutting tool of FIG. 1.

As can be seen from FIGS. 1-3, the locator 50 in FIG. 15 is attached to the pocket 21 of the tool body 3 of the rotary cutting tool 1. The locator 50 is arranged on the rear side of the cutting insert 2 in the tool rotating direction R (i.e., the circumferential direction) of the tool body 3 and between the front wall surface 3*i* that defines the pocket 21 and the lower surface 2*b* of the cutting insert 2. The locator 50 includes: screw engagement parts (contact parts) 50*a*, 50*b* for attaching the locator 50 to the pocket 21 using screws; and threaded holes 50*c* and 50*d* for attaching the second adjustment member 60, which will be described later. It should be noted that the screw members 53, 54 engage with the screw engagement parts 50*a*, 50*b*, respectively, as shown in FIGS. 18 and 19.

The locator 50 has a plate shape and includes two opposing end surfaces 50*e*, 50*f* and a peripheral side surface 50*g* extending therebetween. The locator 50 has a shape similar to the shape of the cutting insert 2. The locator 50 is designed so as to substantially determine the initial setting position of the cutting insert 2 such that, when the cutting insert 2 is arranged as shown in FIG. 1, the cutting edge 2*d* of the cutting insert 2 is projected outward with respect to the locator 50 by a predetermined distance in the radial direction and in the direction of the axis of rotation A of the tool body 3. One end surface 50*e* of the two end surfaces of the locator 50 is configured as a contact surface to be brought into contact with the lower surface 2*b* (opposing the upper surface 2*a* serving as a cutting face) of the cutting insert 2. The locator 50 has, on its end surface 50*e*, a serration 51, corresponding to the serration 31 of the adjustment member 30. The serration 51 is formed in a serration shape so as to be engaged with the serration 31 of the adjustment member 30 and the serration 51 has an engagement part. Although the serration 51 may be configured as various types of recesses and projections or as a combination thereof, it is preferable to have a serration shape. However, the shape of the serration 51 is not limited thereto. The serration 51 of the locator 50 may have any shape, as long as it can correspond to the serration 31 of the adjustment member 30, define the direction of advancement and retraction of the adjustment member 30, and prevent the adjustment member 30 from being tilted. The end surface 50*f* of the locator 50 is configured as a contact surface to be brought into contact with the front wall surface e3*i* of the pocket 21. The screw engagement parts 50*a*, 50*b* are formed as stepped holes that penetrate the two end surfaces 50*e*, 50*f*, respectively. The threaded holes 50*c* and 50*d* are each formed in the peripheral side surface 50*g* and extend substantially in parallel to the two end surfaces 50*e*, 50*f* that are parallel to each other. It should be noted that the serration 51 is formed on a projected portion that is formed so as to be projected outward as a whole from the end surface 50*e* in the opposing direction of the end surfaces 50*e*, 50*f*. As shown in FIG. 19, the cutting insert 2 may be mounted on the projected portion of the locator 50 and on the adjustment member 30, mainly on the adjustment member 30 in this example, within the pocket 21.

As shown in FIGS. 18 and 19, the locator 50 is attached to the tool body 3 by screwing the screw members 53, 54 into the threaded holes in the pocket 21 via holes in the locator 50, and the locator 50 serves as a part of the tool body 3. The locator 50 may not be used and the cutting insert 2 and the adjust member 30 may be directly brought into contact with the front wall surface 3i of the tool body 3. However, the use of the locator 50 can facilitate the formation of an engagement part, such as the serration 51, with a high level of accuracy. The engagement parts 50a, 50b of the locator 50 are not limited to stepped through holes and may employ various known shapes, such as grooves and recesses.

Figure 16:
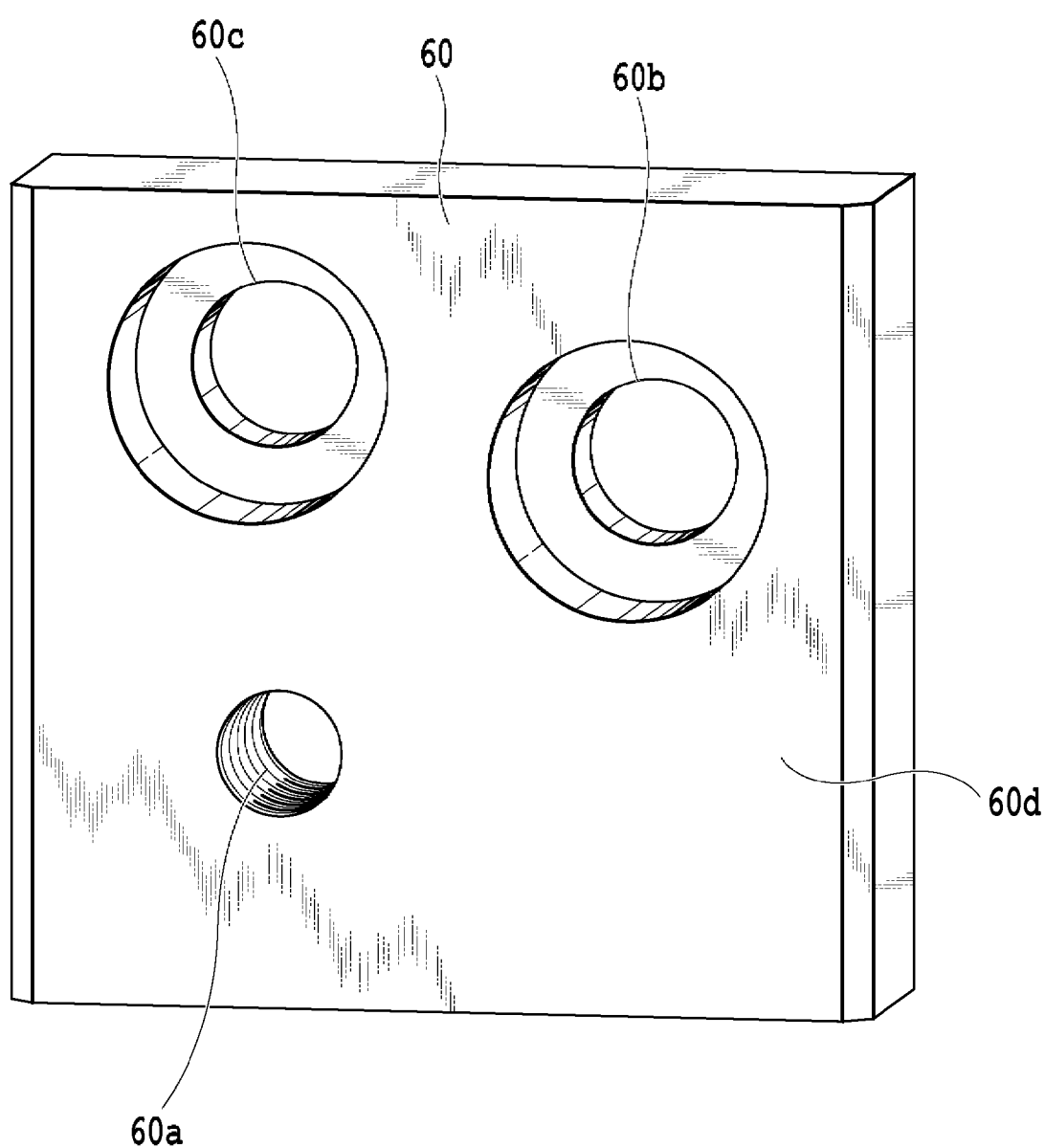
FIG. 16 is a perspective view showing a second adjustment member from which a screw member has been removed, in the cutting tool of FIG. 1.

As shown in FIGS. 1, 3 and 16, the insert attachment mechanism 100 further includes a second adjustment member 60. The second adjustment member 60 includes a body part 60d having a flat plate-like shape. The second adjustment member 60 further includes an adjustment screw 61 for adjusting the position of the cutting edge 2d and, for this reason, the second adjustment member 60 has, in its body part 60d, a threaded hole 60a that allows such adjustment screw 61 to be screwed thereinto. By bringing the adjustment screw 61 into contact with the cutting insert 1 as needed, the position of the cutting edge 2d can be adjusted. The second adjustment member 60 is attached such that a central axis of the adjustment screw 61, being a second screw member, is substantially parallel to the central axis A and such that the adjustment screw 61 can act on the cutting insert 2. The body part 60d of the second adjustment member 60 is attached to the tool body 3 (in this example, the locator 50) by screwing the attachment screws (see FIG. 1) into the threaded holes 50c, 50d of the locator 50 attached to the tool body 3 and fastening the attachment screws. Accordingly, the second adjustment member 60 has, in its body part 60d, engagement parts (contact parts) 60b, 60c for the attachment using the adjustment screws. Although the engagement parts 60b, 60c of the second adjustment member 60 are stepped through holes similar to the engagement parts 50a, 50b of the locator 50, they may employ various known shapes, such as grooves and recesses. The method of adjusting the position of the cutting edge using the second adjust member 60 is not limited to the method using the adjustment screw 61. However, the adjustment method using the adjustment screw 61 as in the present embodiment is a simple method and is therefore favorable, as will be described later. It should be noted that, in FIG. 16, the inner surface of the threaded hole 60a of the second adjustment member 60 is provided with a screw thread.

Materials used for the cutting edge 2d of the cutting inset 2 and its peripheral area may be selected from a cemented carbide, cermet, ceramic, rigid materials such as cubic boron nitride, such rigid materials coated with a PVD coating film or CVD coating film, or diamond. Materials for the parts other than the cutting edge are preferably similar materials, such as rigid materials.

An example procedure for attaching the cutting insert 2 using the above-described insert attachment mechanism 100 will now be described below. However, the following description is not intended to exclude other sequences of operation.

First, the locator 50 is attached to the pocket 21. The locator 50 at this point in time may have the second adjustment member 60 attached thereto. The adjustment member 30 is then located. The adjustment member 30 is arranged such that the threaded hole 30b is located in the recessed part 3g of the pocket 21 and the serration 31 is engaged with the serration 51 of the locator 50. As a result, the adjustment member 30 can substantially move only in a predetermined direction, being a substantially radial direction of the tool body 3 (the direction of the central axis 40c of the screw member 40) in accordance with the engagement between the serrations 31, 51 and can be brought into contact with, for example, the bottom wall surface 3j of the pocket 21. When the adjustment member 30 is arranged, the screw member 40 having the above configuration is screwed into the threaded hole 30c of the adjustment member 30 and the threaded hole 3m of the pocket 21. The wedge member 10 is arranged on the radially outer side of the threaded hole 30b of the adjustment member 30. The cutting insert 2 is arranged on the radially outer side of the body part 30a of the adjustment member 30 in the pocket 21 (i.e., on the outer side of the body part 30a in the radial direction of the tool body 3) such that the upper surface 2a of the cutting insert 2 faces in the tool rotating direction R. In other words, the cutting insert 2 is inserted into the space on the rear side of the wedge member 10 in the tool rotating direction and on the front side of the locator 50 in the tool rotating direction until the cutting insert 2 comes into contact with the adjustment member 30. It should be noted that the wedge member 10 may be arranged on the radially outer side of the threaded hole 30b of the adjustment member 30 after the cutting insert 2 is arranged.

By firmly fastening the fastening screw 20 with the various members being arranged around the cutting insert 2, the cutting insert 2 can be firmly attached to the pocket 21 due to the wedge action of the wedge member 10. At this time, the fastening screw 20 is fastened while the cutting insert 10 is being pressed against the locator 50, the adjustment member 30 and the second adjustment member 60, and the position of the cutting edge 2d is thereby determined by the relative positional relationship between these members.

When the position of the cutting edge 2d of the cutting insert 2 is adjusted substantially in the radial direction with respect to the central axis (the axis of rotation) A of the tool body 3, a wrench or a screwdriver is inserted into the groove 11 of the wedge member 10 toward the screw member 40 with the wedge member 10 being loosened. By rotating the screw member 40 so as to move the adjusting member 30 radially outward, the cutting insert 2 is moved radially outward by the adjustment member 30 and the position of the cutting edge 2d of the cutting insert 2 can be changed. Similarly, by rotating the screw member 40 so as to move the adjustment member 30 radially inward, the cutting insert 2 moves radially inward following the movement of the adjustment member 30, and the position of the cutting edge 2d of the cutting insert 2 can be changed. After the position adjustment of the cutting edge 2d, the wedge member 10 is firmly fixed in the pocket 21 and the attachment of the cutting insert 2 is thereby completed. In this way, the position of the cutting edge 2d of the cutting insert 2 can be easily adjusted with the wedge member 10 and the cutting insert 2 being arranged.

When the position of the cutting edge 2d of the cutting insert 2 is changed in the direction of the central axis A of the tool body 3, the adjustment screw 61 of the second adjustment member 60 is rotated by, for example, a screwdriver, with the wedge member 10 being loosened. When the cutting edge 2d of the cutting insert 2 is moved, for example, outward in the direction of the central axis A, by rotating the adjustment screw 61 around the central axis so as to further screw the adjustment screw 61 into the threaded hole 60a, the cutting insert 2 is moved, from the state shown in FIG. 20A, as shown by an arrow in FIG. 20B. This movement can be easily understood from the fact that the cutting insert 2, which is in contact with the body part 60d of the second adjustment member 60 in FIG. 20A, is in contact with the adjustment screw 61 but spaced apart from the body part 60d of the second adjustment member 60 in FIG. 20B. It should be noted that, although the adjustment member 30 is, in fact, spaced apart from the bottom wall surface 3j of the tool body 3, as in FIGS. 18 and 19, the adjustment member 30 is depicted, in FIGS. 20A and 20B, so as to be in contact with the bottom wall surface 31 to aid in easier understanding of the motion of the adjustment member 30 and its effect.

As described above, in the cutting tool 1 of the present embodiment, the screw member 40 for attaching and moving the adjustment member 30 is accessible from the radially outer side of the wedge member 10 in the state in which the wedge member 10 is arranged. Accordingly, the position (particularly the position in the radial direction) of the adjustment member 30 can be adjusted while the wedge member 10 and the cutting insert 2 are being arranged and the position of the cutting edge 2d of the cutting insert 2 can be adjusted easily and rapidly. In addition, since the position adjustment of the cutting edge 2d is performed by moving the screw member 40, the amount of position adjustment of the cutting edge can be set arbitrarily. Accordingly, when, for example, the cutting edge is sharpened, the position of the cutting edge can be adjusted more appropriately.

In addition, in the adjustment direction that intersects with the adjustment direction of the position of the cutting edge by the adjustment member 30 (i.e., the adjustment direction in the radial direction), in particular, in the adjustment direction that is substantially orthogonal to the adjustment direction of the position of the cutting edge by the adjustment member 30 in this example (i.e., the adjustment direction in the direction of the central axis A), the position of the cutting edge 2d can be adjusted using the second adjustment member 60. Since the position adjustment of the cutting edge by the adjustment screw 61 of such second adjustment member 60 is also a position adjustment using the screw mechanism, the amount of position adjustment of the cutting edge can be set arbitrarily. Since the position of the cutting edge can be adjusted in two directions substantially orthogonal to each other (i.e., in the radial direction and the axial direction), the cutting edge can be located more accurately. The insert attachment mechanism may be changed so that the position adjustment direction of the cutting edge by the adjustment member 30 intersects with, but is not orthogonal to, the position adjustment direction of the cutting edge by the second adjustment member 60.

The present invention is not limited to the embodiments described above but encompasses various other embodiments. Various modifications and additions may be made to the above embodiments without departing from the gist of the present invention. For example, the shape of the groove to be formed by the cutting tool according to the present invention is not limited to a tooth form of a gear. The present invention is also applicable to a rotary cutting tool that uses a wedge member for attaching a cutting insert, such as a face milling cutter, without being limited to the side cutter.

The present invention encompasses all kinds of modifications, applications and equivalents that are encompassed by the idea of the present invention defined by the scope of the claims.

What is claimed is:

1. An insert attachment mechanism (100) for detachably attaching a cutting insert (2) to an insert attachment part (21) of a tool body (3), the insert attachment mechanism comprising:
    a first adjustment member (30) arranged on an inner side of the cutting insert in the insert attachment part to act on the cutting insert, in which a first screw member (40) is screwed into at least one threaded hole formed in at least one of the first adjustment member (30) and the insert attachment part (21), the first adjustment member (30) being advanceable and retractable in a direction of a central axis of the first screw member (40) by rotating the first screw member (40); and
    a wedge member (10) arranged together with the cutting insert on an outer side of the first adjustment member (30) in the insert attachment part, the wedge member (10) being attached so as to exert a pressing force against the cutting insert and an inner wall surface of the insert attachment part by a wedge attachment member (20),
    wherein the wedge member (10) is configured such that the first screw member (40) is accessible from an outer side of the wedge member (10), and
    wherein the wedge member (10) has a groove (11) or a through hole for allowing access to the first screw member (40).

2. An insert attachment mechanism (100) for detachably attaching a cutting insert (2) to an insert attachment part (21) of a tool body (3), the insert attachment mechanism comprising:
    a first adjustment member (30) arranged on an inner side of the cutting insert in the insert attachment part to act on the cutting insert, in which a first screw member (40) is screwed into at least one threaded hole formed in at least one of the first adjustment member (30) and the insert attachment part (21), the first adjustment member (30) being advanceable and retractable in a direction of a central axis of the first screw member (40) by rotating the first screw member (40); and
    a wedge member (10) arranged together with the cutting insert on an outer side of the first adjustment member (30) in the insert attachment part, the wedge member (10) being attached so as to exert a pressing force against the cutting insert and an inner wall surface of the insert attachment part by a wedge attachment member (20),
    wherein the wedge member (10) is configured such that the first screw member (40) is accessible from an outer side of the wedge member (10), and
    wherein the first screw member (40) includes two screw parts having different winding directions, one of the two screw parts being screwed into a threaded hole formed in the first adjustment member (30) and the other one of the screw parts being screwed into a threaded hole formed in the insert attachment part (21).

3. An insert attachment mechanism (100) for detachably attaching a cutting insert (2) to an insert attachment part (21) of a tool body (3), the insert attachment mechanism comprising:
    a first adjustment member (30) arranged on an inner side of the cutting insert in the insert attachment part to act on the cutting insert, in which a first screw member (40) is screwed into at least one threaded hole formed in at least one of the first adjustment member (30) and the insert attachment part (21), the first adjustment member (30) being advanceable and retractable in a direction of a central axis of the first screw member (40) by rotating the first screw member (40); and a wedge member (10) arranged together with the cutting insert on an outer side of the first adjustment member (30) in the insert attachment part, the wedge member (10) being attached so as to exert a pressing force against the cutting insert and an inner wall surface of the insert attachment part by a wedge attachment member (20), wherein the wedge member (10) is configured such that the first screw member (40) is accessible from an outer side of the wedge member (10), and wherein the first adjustment member (30) has a first engagement part (31) that is engageable with a second engagement part (51) provided on the insert attachment part so as to guide a movement of the first adjustment member in the direction of the central axis of the first screw member (40).

4. The insert attachment mechanism according to claim 3, wherein the first engagement part (31) of the first adjustment member (30) has a serration shape.

5. The insert attachment mechanism according to claim 3, further comprising a locator (50) to be arranged in the insert attachment part, wherein the second engagement part (51) of the insert attachment part is formed in the locator (50).

6. The insert attachment mechanism according to claim 5, further comprising a second adjustment member (60) for moving the cutting insert in a second direction that intersects with a moving direction of the first adjustment member (30) associated with a rotation of the first screw member (40), the second adjustment member (60) comprising a second screw member (61) that is advanceable and retractable in the second direction.

7. A cutting tool (1) comprising:

a tool body (3) having an insert attachment mechanism for detachably attaching a cutting insert (2) to an insert attachment part (21) of the tool body (3); and the cutting insert detachably attached to the tool body (3) by the insert attachment mechanism, wherein the insert attachment mechanism comprises:

a first adjustment member (30) arranged on an inner side of the cutting insert in the insert attachment part to act on the cutting insert, in which a first screw member (40) is screwed into at least one threaded hole formed in at least one of the first adjustment member (30) and the insert attachment part (21), the first adjustment member (30) being advanceable and retractable in a direction of a central axis of the first screw member (40) by rotating the first screw member (40); and a wedge member (10) arranged together with the cutting insert on an outer side of the first adjustment member (30) in the insert attachment part, the wedge member (10) being attached so as to exert a pressing force against the cutting insert and an inner wall surface of the insert attachment part by a wedge attachment member (20), wherein the wedge member (10) is configured such that the first screw member (40) is accessible from an outer side of the wedge member (10), and wherein:

the cutting tool is a rotary cutting tool rotated around an axis of rotation (A);

the insert attachment mechanism further comprises a second adjustment member (60) for moving the cutting insert in a second direction substantially orthogonal to a moving direction of the first adjustment member (30) associated with a rotation of the first screw member (40), the second adjustment member (60) comprising a second screw member (61) that is advanceable and retractable in the second direction; and the second direction of the second screw member (61) is a direction substantially parallel to the axis of rotation (A) of the rotary cutting tool.

8. A tool body (3) having an axis of rotation (A) and a rotating direction (R), and comprising:

two opposing end surfaces (3a, 3b) and a peripheral part (3c) extending between two end surfaces;

a plurality of circumferentially spaced apart insert pockets (21) arranged around the peripheral part (3c), each insert pocket (21) having a rear wall surface (3h) facing backward in the rotation direction (R), a front wall surface (3i) facing forward in the rotating direction (R), a bottom wall surface (3j) extending between the rear and front wall surfaces (3h, 3i), a first threaded hole (3m) and a second threaded hole (3k); and an insert attachment mechanism (100) associated with each insert pocket (21), the insert attachment mechanism comprising:

a first adjustment member (30) having an adjustment member threaded hole (30c) and an insert contacting surface (30g), the first adjustment member (30) being detachably attached to the insert pocket (21) by a first screw member (40) which passes though the adjustment member threaded hole (3c) and into the insert pocket's first threaded hole (3m), wherein rotation of the first screw member (40) in opposite directions causes the first adjustment member to advance or retract with respect to the insert pocket (21) along a central axis (40c) of the first screw member (40); and a wedge member (10) detachably attached to the insert pocket (21) by a fastening screw (20) screwed into the insert pocket's second threaded hole (3k);

wherein:

within the insert pocket (21), the wedge member (10) is radially outward of the first adjustment member (30); and the first screw member (40) is accessible only from a radially outer side of the wedge member (10).

9. The tool body (3) according to claim 8, wherein:

the wedge member (10) has a groove (11) or a through hole; and the first screw member (40) is accessible only through said groove (11) or through hole.

10. The tool body (3) according to claim 8, wherein:

the first screw member (40) includes two screw parts having different winding directions;

one of the two screw parts is screwed into the adjustment member threaded hole (30c); and the other one of the two screw parts is screwed into the first threaded hole (3m) formed in the insert pocket (21).

11. The tool body (3) according to claim 8, wherein:

the first adjustment member (30) has a first engagement part (31);

the inset pocket (21) is provided with a second engagement part (51); and the first engagement part (31) is configured to engage the second engagement part (51) so as to guide the first adjustment member (30) in the direction of the first screw member's central axis (40c).

12. The tool body (3) according to claim 11, wherein:
the first engagement part (31) has a serration shape; and
the second engagement part (51) has a serration shape.

13. A rotary cutting tool (1), comprising:
the tool body (3) according to claim 8, and
a cutting insert retained in each insert pocket (21) by said insert attachment mechanism (100), the cutting insert being radially outward of the first adjustment member (30), within said each insert pocket (21).

14. The rotary cutting tool (1) according to claim 13, wherein:
the wedge member (10) front and rear contact surfaces (10c, 10d);
the cutting insert has first and second end surfaces (2a, 2b) and a peripheral side surface (2c) extending between the first and second end surfaces (2a, 2b);
the adjustment member's insert contacting surface (30g) is in abutment with the cutting insert's peripheral side surface (2c);
one of the wedge member's front and rear contact surfaces (10c, 10d) is in abutment with the cutting insert's first end surfaces (2a);
the other of the wedge member's front and rear contact surfaces (10c, 10d) is in abutment with one of the insert pocket's rear and front wall surfaces (3h, 3i).

15. The rotary cutting tool according to claim 14, further comprising:
a locator (50) removably attached to the insert pocket (21) and in abutment with the cutting insert's second end surface (2b); wherein:
the first adjustment member (30) has a first engagement part (31);
the inset pocket (21) is provided with a second engagement part (51);
the first engagement part (31) is configured to engage the second engagement part (51) so as to guide the first adjustment member (30) in the direction of the first screw member's central axis (40c); and
the second engagement part (51) is formed in the locator (50).

16. The rotary cutting tool according to claim 13, further comprising:
a second adjustment member (60) comprising a second screw member (61); wherein:
rotation of the second screw member (61) moves the cutting insert in a second direction that intersects with a moving direction of the first adjustment member (30).

* * * * *